United States Patent [19]
Mochizuki et al.

[11] Patent Number: 5,739,885
[45] Date of Patent: Apr. 14, 1998

[54] FERROELECTRIC LIQUID CRYSTAL DISPLAY

[75] Inventors: Akihiro Mochizuki; Shigeo Kasahara; Tetsuya Makino; Masashi Watanabe, all of Kawasaki, Japan

[73] Assignee: Fujitsu Limited, Kanagawa, Japan

[21] Appl. No.: 832,961

[22] Filed: Apr. 4, 1997

Related U.S. Application Data

[63] Continuation of Ser. No. 98,027, Jul. 28, 1993, abandoned.

[30] Foreign Application Priority Data

Jul. 28, 1992  [JP]  Japan ................... 4-200834

[51] Int. Cl.⁶ ............................................. G02F 1/141
[52] U.S. Cl. .............................................. 349/135; 349/133
[58] Field of Search .......................... 359/75, 76, 78, 359/82, 79, 103; 349/123, 132, 133, 135

[56] References Cited

U.S. PATENT DOCUMENTS

| | | | |
|---|---|---|---|
| 4,376,195 | 3/1983 | Lee | 528/353 |
| 4,939,003 | 7/1990 | Aoki et al. | 359/75 |
| 4,941,735 | 7/1990 | Moddel et al. | 359/72 |
| 4,965,017 | 10/1990 | Holmes et al. | 252/299.4 |
| 5,099,344 | 3/1992 | Tsuboyama et al. | 359/75 |
| 5,384,168 | 1/1995 | Dübal et al. | 428/1 |

FOREIGN PATENT DOCUMENTS

| | | | |
|---|---|---|---|
| 55-53317 | 4/1980 | Japan . | |
| 55-79412 | 6/1980 | Japan . | |
| 55-105224 | 8/1980 | Japan . | |
| 59-109027 | 6/1984 | Japan . | |
| 0225470 | 6/1987 | Japan | 359/80 |
| 63-121020 | 5/1988 | Japan . | |
| 63-163425 | 7/1988 | Japan . | |
| 1-244428 | 9/1989 | Japan . | |
| 5107525 | 4/1993 | Japan | 359/90 |

OTHER PUBLICATIONS

Yokokusa et al, Abstract to JP 55-163513, Dec. 1980.
Escher et al., "Impact of Ionic Impurities on the Performance of SSFLC-Displays—a Quantitative Analysis", *Conference Record of Japan Display*, 1989, Kyoto, Japan, pp. 348-351.
Mochizuki et al., "Elimination of Crosstalk in Highly Multiplexed STN-LCDs by Using Conducting Orientation Films", *Proceedings of SID*, vol. 31/4, 1990, Japan, pp. 327-332.
Mugridge et al., "Transit Times of Native Ions in Ferroelectric Liquid Crystals for High-Resolution Display Panels", *Conference Record of Japan Display*, 1992, Hiroshima, Japan, pp. 583-586.

Primary Examiner—William L. Sikes
Assistant Examiner—James A. Dudek
Attorney, Agent, or Firm—Staas & Halsey

[57] ABSTRACT

In a ferroelectric liquid crystal display comprising a pair of transparent substrates each provided with a transparent electrode and an aligning film and a liquid crystal layer sandwiched between said substrates, the aligning film is subjected to a deionization treatment with, for example, an ion-exchange resin to reduce the total content of impurity ions in the aligning film of a polyimide resin or the like to 300 ppm or less, to reduce the total content of impurity cations to 200 ppm or less, to reduce the total content of $Cl^-$, $(COO_2)^{2-}$ and $CH_3COO^-$ to 100 ppm or less and the content of each of these ions to 50 ppm or less, or to reduce the total content of $PO_4^{3-}$, $NO_3^-$ and $SO_4^{2-}$ to 100 ppm or less and the content of each of these ions to 50 ppm or less.

4 Claims, 14 Drawing Sheets

FERROELECTRIC LIQUID CRYSTAL DISPLAY

This application is a continuation of application Ser. No. 08/098,027, filed Jul. 28, 1993, now abandoned.

BACKGROUND OF INVENTION

1. Field of the Invention

The present invention relates to a ferroelectric liquid crystal display device and a process for producing the same.

2. Description of the Related Art

As office automation (OA) and downsizing advance, information processors, such as word processors, personal computers and work stations, have become widely spread. This has enhanced the importance of displays, as a man-machine interface of these information processors, and liquid crystal displays (LCD) have become indispensable as a flat panel display drivable at a relatively low voltage from the information processors.

In LCD displays, which are currently most widely used as a display for personal computers, word processors, etc., use is made of a supertwisted nematic (STN) liquid crystal.

Since, STN can effect a display of an intermediate information content of 640×400 pixels at a relatively low voltage of about 20 V and a contrast ratio of about 10:1, it can satisfy a fundamental display function requirement for personal computers and the like.

As described above, however, since downsizing has personalized even information processors, such as work stations, a higher information content, a larger area, a quicker response, a higher contrast ratio, a wider viewing angle, etc., have become required of displays as well.

Although it is not very difficult to realize a large area display having a diagonal line length exceeding 15 in. (hereinafter referred to as "exceeding 15 in.") and capable of directly driving the liquid crystal by adopting a simple matrix panel using an STN, it is very difficult to increase the display information content to 1240×1028 pixels (about 1,000,000 pixels although the necessary number of pixels varies depending upon types of machines) required of workstations. Even though the number of pixels could be increased to the above-described value, an STN gives rise (i.e., subject to) to a remarkable deterioration in the contrast ratio and speed of response, so that the quality of the display becomes poor.

Under these circumstances, two methods have been proposed and developed as a technique for rendering the LCD compatible with displays of the workstation class.

One of them is related to the so-called "active matrix display," wherein a nonlinear active element, such as a film transistor, is formed at each point of intersection (pixel) of a matrix, while the other method is related to a ferroelectric liquid crystal display wherein, as with an STN, the liquid crystal is directly driven in a simple matrix panel.

In the active matrix display, since it is possible to apply a voltage for driving the liquid crystal with a sufficient window for each pixel, a high contrast ratio and a quick response can be theoretically expected.

However, the production of an active matrix panel having a large information content of 1240×1028 pixels and a large area exceeding 15 in. is very difficult for the following two reasons.

The first reason is as follows. When a display having a large size exceeding 6 in. is produced, at the present time, a thin film transistor of amorphous silicon (a-Si) is used due to a technical difficulty of forming a single crystal semiconductor wafer exceeding 6 in. In a-Si, the mobility of electrons is so low that there is a limitation on the achievable increase in the area and information content. For this reason, it is said that, at the present time, the upper limit of the size of the display is about 15 in. in terms of the diagonal line length, from a technical viewpoint.

The second reason is related to the producibility. In a display of the 1240×1028 pixel class, since the provision of a liquid crystal panel which is substantially defect-free on a single substrate is required, the yield is so low that the production cost becomes high. For this reason, in the current production technique, to say the least, the production cost is prohibitively high as compared with that of cathode ray tube displays (CRT).

On the other hand, the ferroelectric liquid crystal display can be theoretically used as a display of the workstation class because a high information content display is possible in a simple matrix panel. However, in order to realize a practical ferroelectric liquid crystal display (FLCD), it is necessary to accomplish several tasks.

Among these tasks, a particularly large task is to attain a large area and a homogeneous orientation in the orientation of liquid crystal molecules and to ensure the stability of molecular orientation against external force.

In conventional ferroelectric liquid crystal displays, a zigzag orientation defect or other unfavorable defect is significant. In particular, in displays having a large area, a variation in the orientation in the plane direction is so large that the contrast ratio significantly varies from place to place.

Further, the molecular orientation of the liquid crystal is disordered by a mechanical external force, which makes it impossible to keep an image on a screen. This problem is fatal to LCD. In order to avoid the failure of orientation caused by a mechanical external force, an attempt to devise a suitable mounting for a liquid crystal panel has been made in the art.

Examples of such a device include the provision of a shock absorbing material between the frame and the liquid crystal panel so that the mechanical external force is not directly conveyed to the liquid crystal panel.

Although this means is effective, it is not a substantial solution to the problem. Specifically, in mounting, when there is no space for inserting the shock absorbing material or when an external force, which cannot be absorbed by the shock absorbing material, is applied, it becomes impossible to keep an image on a screen image.

As described above, the most important task to be accomplished in the application of FLCD to the display of the workstation class is to attain a large area and a homogeneous orientation and to ensure the stability of the molecular orientation against mechanical external force.

Accordingly, an object of the present invention is to provide a ferroelectric liquid crystal display that can realize a large area and a homogeneous orientation and, at the same time, can accomplish the stabilization of molecular orientation against mechanical external force and quick polarization switching.

SUMMARY OF THE INVENTION

In order to attain the above-described object, the present invention provides a ferroelectric liquid crystal display device comprising a pair of transparent substrates each having a transparent electrode provided on the inner surface thereof, an aligning film of a resin provided on a surface of each of the transparent electrodes remote from the respective transparent substrates and a ferroelectric liquid crystal layer sandwiched between the aligning films of the resin, the total content of impurity ions in the aligning film of the resin being 300 ppm or less.

Similarly, in order to attain the above-described object, the presents invention provides a ferroelectric liquid crystal display device wherein the total content of cations in the aligning film of the resin is 200 ppm or less, a ferroelectric liquid crystal display wherein the total content of $Cl^-$, $(COO_2)^{2-}$ and $CH_3CO)^-$ in the aligning film of the resin is 100 ppm or less and the content of each of the ions is 50 ppm or less, and a ferroelectric liquid crystal display wherein the total content of $PO_4^{3-}$, $NO_3^-$ and $SO_4^{2-}$ in the aligning film of the resin is 100 ppm or less and the content of each of the ions is 50 ppm or less.

In these cases, the aligning film of the resin may comprise a polyimide resin.

Further, in the process for producing a ferroelectric liquid crystal display device according to the present invention, the step of deionizing an aligning film of a resin or a resin for forming the aligning film with an ion-exchange resin is provided for the purpose of reducing or optimizing the content of impurity ions in an aliging film of a resin.

The removal of impurity ions contained in the aligning film of the resin suffices for attaining the object of the present invention because the content of impurity ions in a liquid crystal material is prohibitively low and negligible.

DESCRIPTION OF THE PREFERRED EMBODIMENTS

The molecular orientation of a ferroelectric liquid crystal is fundamentally different from that of an STN liquid crystal known in the art.

Specifically, since the STN liquid crystal is a paraelectric material, an induced polarization occurs only when an electric field is externally applied thereto which gives rise to a torque force which produces a change in the molecular orientation. In this case, where no electric field is applied, the Coulomb interaction in the interface of the liquid crystal and the aligning film of a resin in contact with each other is relatively weak.

By contrast, since the ferroelectric liquid crystal always has a spontaneous polarization independent of the presence or absence of an applied electric field, the Coulomb interaction in the interface of the liquid crystal and the aligning film is so strong that the interfacial interaction between the ferroelectric liquid crystal molecules and the aligning film is considered to be greatly influenced by the species and content of ions in the aligning film.

The occurrence of such a strong interaction in the interface of the ferroelectric liquid crystal and the aligning film is observed also in the STN liquid crystal in the case of a combination of special aligning film and liquid crystal material (see A. Mochizuki et al., Japanese Journal of Applied Physics, Vol. 29, 1898). In this case as well, a ferroelectric layer is formed in the interface of the aligning film and the liquid crystal. This is an example of the molecular orientation of a liquid crystal involving a strong Coulomb interaction.

In the molecular orientation of a liquid crystal having a spontaneous polarization, such as a ferroelectric liquid crystal, it is considered that liquid crystal molecules are strongly anchored or immobilized at the interface of the liquid crystal and the aligning film by a very small amount of ions contained in the aligning film, which causes the orientation to be partially disordered or the liquid crystal layer structure to become liable to be disordered by mechanical external force. For example, a polyimide commonly used as an aligning film in the art contains $Cl^-$ although the content is on the order of ppm.

In general, $Cl^-$ is firmly coupled with ferroelectric liquid crystal molecules thereby strongly immobilizes the liquid crystal molecules at the interface of the liquid crystal and the aligning film, although this depends also upon the molecular structure of the liquid crystal used.

Figure 1A:
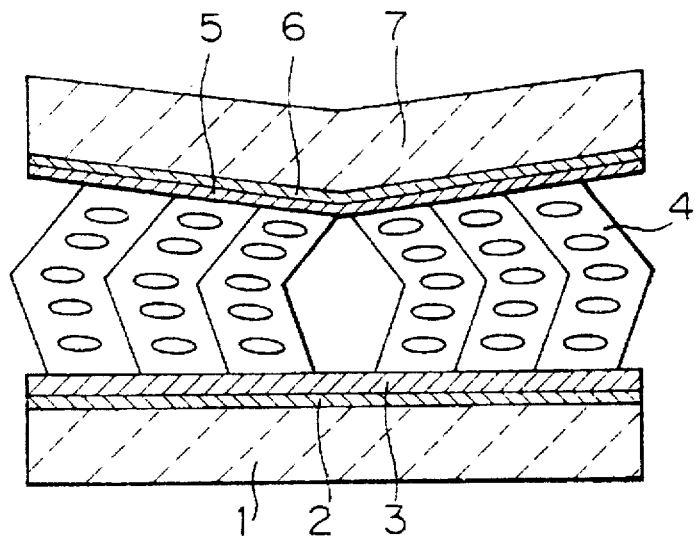
FIGS. 1A and 1B are schematic diagrams showing the influence of an external force on a liquid crystal display structure of a ferroelectric liquid crystal display.
Figure 1B:
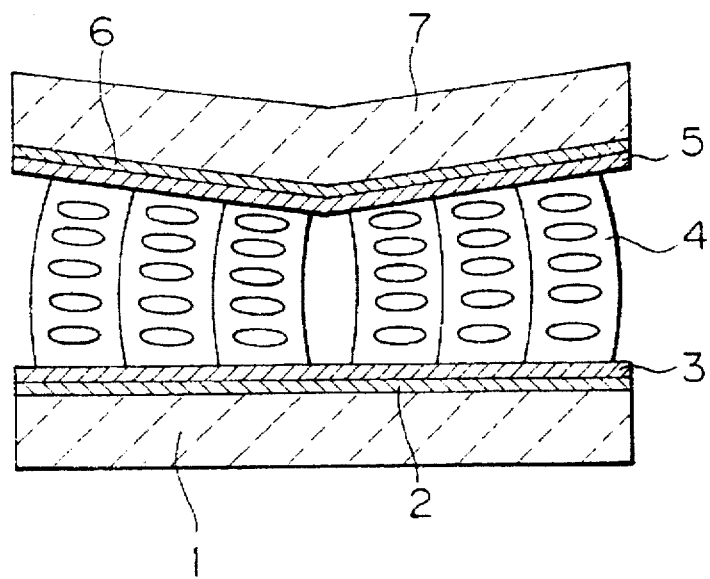

FIGS. 1A and 1B are schematic diagrams showing an influence of an external force on a liquid crystal layer structure of a ferroelectric liquid crystal display.

FIG. 1A shows the influence of an external force when the capability of the aligning film to regulate the orientation of the liquid crystal layer structure is high, and FIG. 1B shows the influence of an external force when the capability of the aligning film to regulate the orientation of the liquid crystal layer structure is low.

In FIGS. 1A and 1B, numerals 1 and 7 each designate a transparent substrate, numerals 2 and 6 a transparent electrode, numerals 3 and 5 an aligning film, and numeral 4 a ferroelectric liquid crystal layer.

As shown in the drawings, the liquid crystal display comprises a transparent substrate 1, a transparent electrode 2 and an aligning film 3 provided on the transparent substrate 1, a transparent substrate 7, a transparent electrode 6 and an aligning film 5 provided on a transparent substrate 7, and a liquid crystal layer 4 sandwiched between the aligning film 3 and the aligning film 5 in such a manner that the transparent electrode 2 and the transparent electrode 6 on the respective electrode sheets face each other.

If a mechanical force is externally applied to this liquid crystal display, the electrode sheet is deformed and the liquid crystal layer is compressed. In this case, if liquid crystal molecules are strongly anchored at the interface of the liquid crystal and the aligning film when an external force is applied to the liquid crystal display as schematically shown in FIG. 1A, since the degree of freedom of relative movement of the liquid crystal molecules present in the interface of the liquid crystal and the aligning film is low against the aligning film, the orientation of liquid crystal molecules near the interface is forcibly drawn by the deformation of the electrode sheet (aligning film) and liquid crystal molecules adjacent to those present near the interface are also successively restrained, which results in a large difference in the displacement between the liquid crystal structure at the center portion of the panel and the liquid crystal structure in the interface, so that an unrestorable strain finally occurs in the liquid crystal structure (that is, the so-called "chevron structure" is formed).

Further, if the above-described strong molecular orientation locally exists, the direction of growth of the liquid crystal layer structure is inhibited, so that a domain is unfavorably formed. In particular, when the interfacial interaction is large, a multi-domain is formed around that location, which deteriorates the quality of display.

On the other hand, when liquid crystal molecules are weakly anchored or at the interface of the liquid crystal and the aligning film, it is considered that, even though the electrode sheet is deformed, since the liquid crystal molecules present in the interface can be relatively freely moved against the aligning film, as schematically shown in FIG. 1B, although the liquid crystal layer 4 in the interface is displaced by the deformation of the electrode until an equilibrium state is accomplished, the deformation of the liquid crystal structure is limited to a relatively small extent and the removal of the external force causes the liquid crystal structure to be restored to the original state.

For this reason, strong Coulomb interaction in the interface of the aligning film and the liquid crystal should be avoided from the viewpoint of both the large area/homogeneous orientation and the stability of orientation.

In view of the above, the present inventors have effected the determination of ion species contained in various polyimides used as the aligning film and the contents thereof by ion chromatography with a view to investigating the relationship between impurity ions contained in the aligning film and the molecular orientation of the liquid crystal. As a result, the following facts have been found. The details thereof will be described in the following Examples.

(1) The total content of impurity ions in the aligning film of the resin is preferably 300 ppm or less.

The total content of impurity ions has a significant effect on the homogeneity of the molecular orientation, stability of the molecular orientation (stress resistance) and polarization switching (response time). Further, apart from the above-described correlation, the presence of ionic impurities in a large amount in the aligning film generally unfavorably leads to the decomposition of the liquid crystal and other unfavorable phenomena.

The homogeneity of the molecular orientation is one of the factors determining the display contrast ratio and has an effect on the quality of images. With a total ion content in the range of from 200 to 300 ppm as the border, when the total ion content is lower than this range, the quantity of transmitted light becomes small and a high contrast ratio is obtained (see FIG. 6A).

Figure 6A:
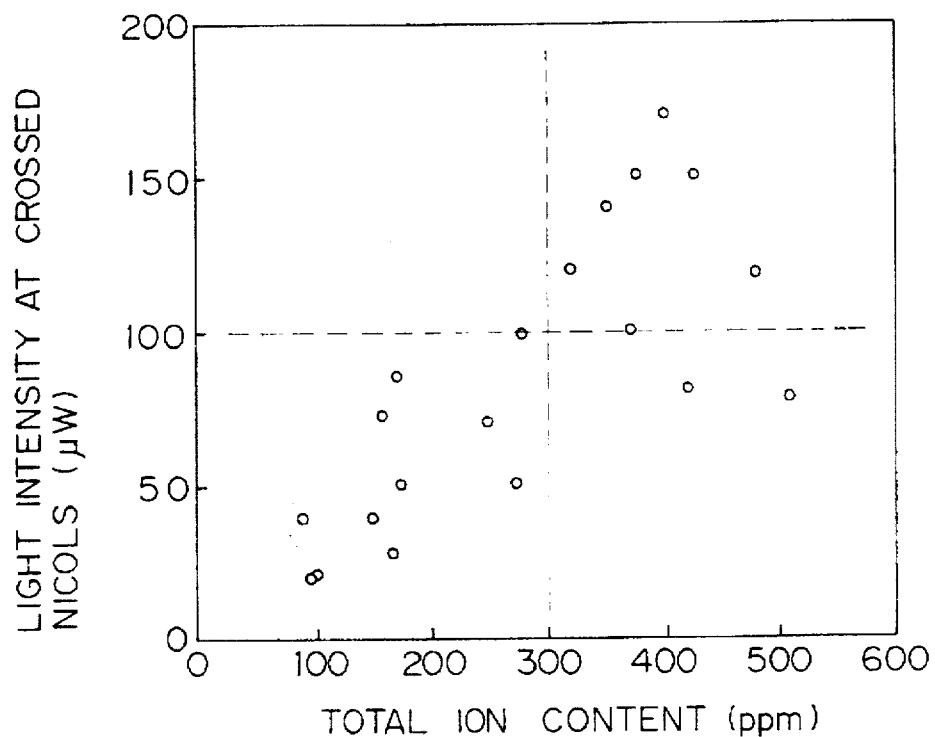
FIGS. 6A, 6B, 7A and 7B are diagrams showing the relationship between the impurity ion content and the quantity of transmitted light at an extinction position of a liquid crystal panel.

With respect to the stability of the molecular orientation, with a total ion content in the range of from 300 to 400 ppm as the border, when the total ion content is higher than this range, the stress resistance rapidly lowers (see FIG. 6A).

The polarization switching time is a factor determining the response time of the liquid crystal, and the shorter the polarization switching time, the quicker the response. In general, the lower the ion content, the shorter the switching time and the quicker the response. However, when the total ion content is higher than the range of from 200 to 300 ppm, the response time becomes substantially constant and the correlation between the response time and the total ion content is lost (see FIG. 4A).

Since the total ion content is preferably minimized from the viewpoint of the above-described correlation and the decomposition of the liquid crystal, well-balanced characteristics can be offered when the total content of impurity ions is 300 ppm or less.

(2) The total content of impurity cations in the aligning film of the resin is preferably 200 ppm or less.

Fundamentally, the correlation described above in connection with the total ion content is established also when the impurity ions are cations.

Figure 6B:
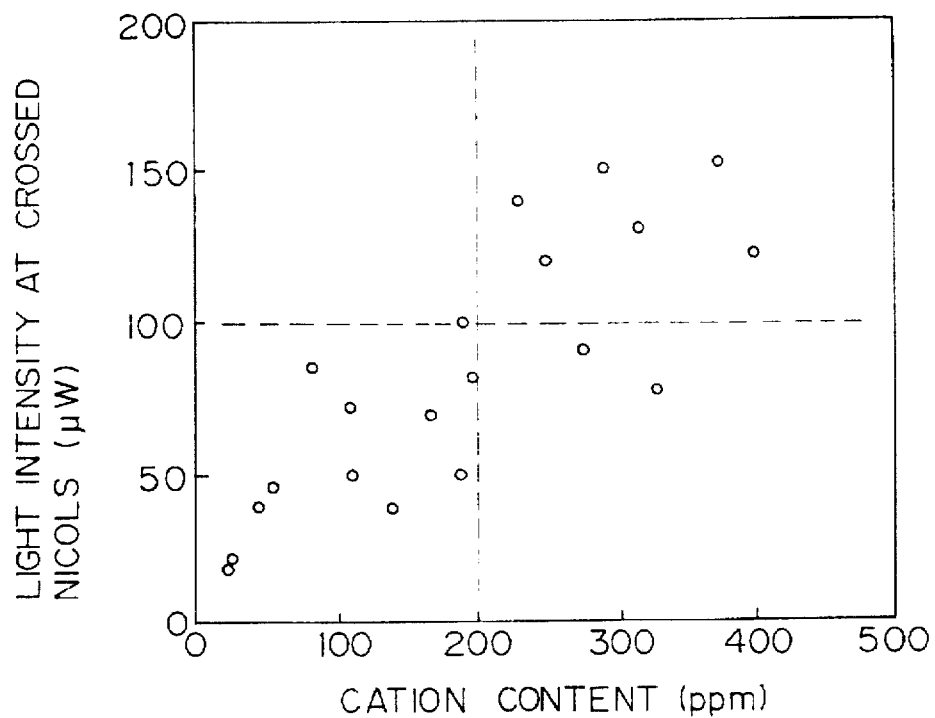

With respect to the homogeneity of the molecular orientation, the quantity of transmitted light at an extinction position rapidly increases when the cation content exceeds the range of from 250 to 300 ppm, which gives rise to a lowering in the contrast ratio (see FIG. 6B).

Figure 8A:
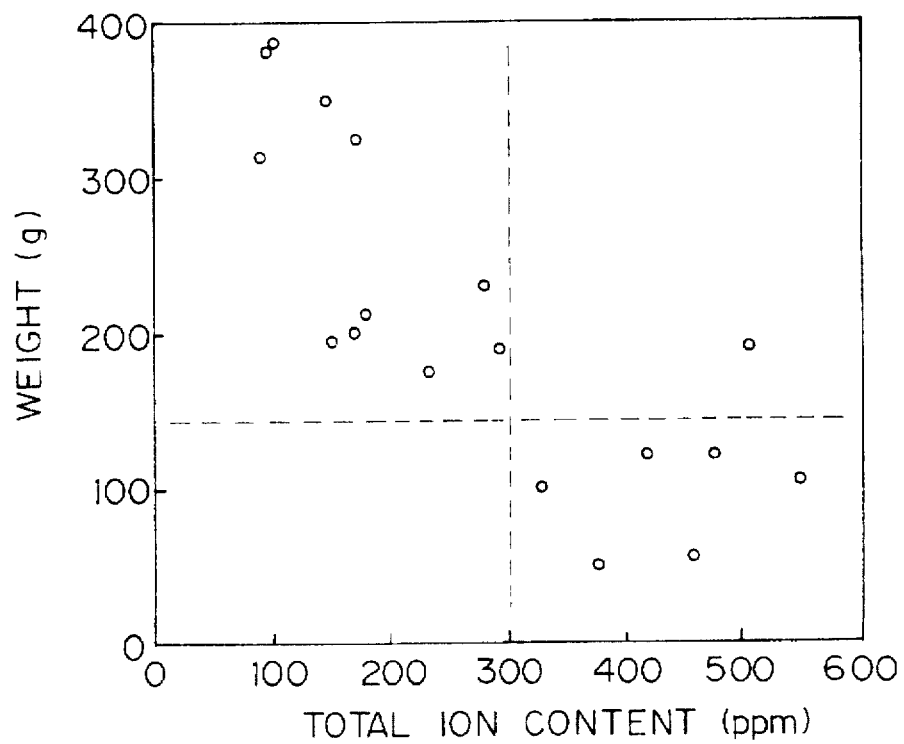
FIGS. 8A, 8B, 9A and 9B are diagrams showing the relationship between the impurity ion content and the stability of molecular orientation of a liquid crystal against external force.
Figure 8B:
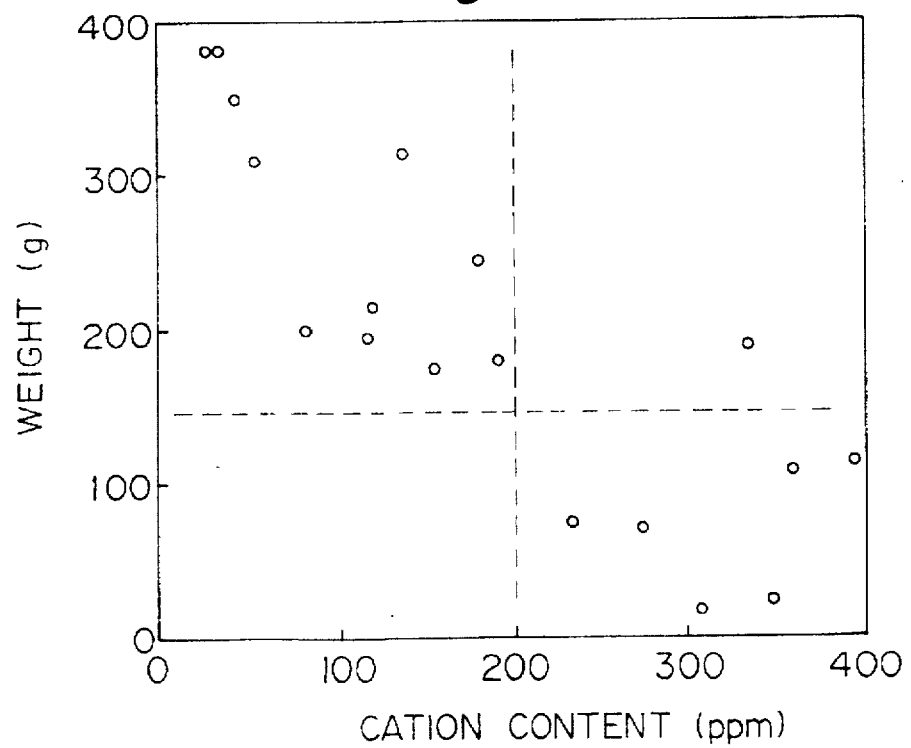

With respect to the stability of the molecular orientation, the stress resistance rapidly lowers when the cation content exceeds the range of from 200 to 300 ppm (see FIG. 8B).

The polarization switching time becomes short with lowering the cation content, and when the cation content exceeds about 100 ppm, the correlation between the cation content and the polarization switching time is lost.

Since the cation content is preferably minimized from the viewpoint of the above-described correlation and the decomposition of the liquid crystal, well-balanced characteristics can be offered when the total content of impurity ions is 200 ppm or less.

(3) The total content of $Cl^-$, $(COO_2)^{2-}$ and $CH_3COO^-$ in the aligning film is preferably 100 ppm or less, and the content of each of these ions is preferably 50 ppm or less. It has been confirmed that when $Cl^-$, $(COO_2)^{2-}$ and $CH_3COO^-$ (hereinafter often referred to as "$Cl^-$ ion, etc.") are present in a large amount, the capability of the aligning film to regulate the molecular orientation of the liquid crystal in the interface of the liquid crystal and the aligning film becomes so large that a multi-domain is liable to occur in the molecular orientation and an irreversible change in the liquid crystal layer is liable to occur when mechanical external force is applied to the liquid crystal panel (see FIGS. 7, 9, 10, 11 and 12).

(4) The total content of $PO_4^{3-}$, $NO_3^-$ and $SO_4^{2-}$ in the aligning film of the resin is preferably 100 ppm or less, and the content of each of these ions is preferably 50 ppm or less.

When the aligning film contains a suitable amount of $PO_4^{3-}$, $NO_3^-$ and $SO_4^{2-}$ (hereinafter often referred to as "PO$_4^{3-}$ ion, etc."), the polarization switching time of the liquid crystal panel can be shortened (see FIGS. 13A to 15C).

Therefore, in order to shorten the polarization switching time of the liquid crystal panel through smooth polarization switching, it is preferred for PO$_4^{3-}$ ion, etc., to exist on a certain level in the aligning film.

Accordingly, it has been found that minimizing the capability of the aligning film to regulate the molecular orientation of the liquid crystal in the interface of the liquid crystal and the aligning film is effective for attaining the large area/homogeneous orientation and the stabilization of the layer structure against the mechanical external force. Further, it has also been found that the regulation of the ion species contained in the aligning film and the content thereof is useful for attaining this purpose.

In connection with FIGS. 1A and 1B, the aligning film of a resin for a ferroelectric liquid crystal panel serves to align ferroelectric liquid crystal molecules parallel to the substrates. In this case, the parallel alignment is effected with an intermediate restraint so that the liquid crystal molecules can be subjected to polarization switching according to the applied electric field. Therefore, even when external stress is applied to the panel, the liquid crystal molecules present in the interface of the liquid crystal and the aligning film should also be freely moved to some extent against the aligning film. However, the presence of impurity ions in a particular amount or more in the aligning film of the resin causes the liquid crystal molecules (having a polarity) at the interface of the liquid crystal and the aligning film to be electrostatically attracted or anchored or adsorpted by the aligning film of the resin, which inhibits the liquid crystal molecules from relatively freely moving against the aligning film. According to the present invention, such force restraining the liquid crystal molecules is removed.

EXAMPLES

The present invention will now be described in more detail with reference to the following experiments and examples.

At the outset, the species and content of impurity ions in various polyimide samples were determined for the purpose of specifying the impurity ion species and the content thereof in the aligning film that enables the object of the present invention to be attained.

Determination methods were as follows.

A polyimide coating solution for a liquid crystal orientation film was spin-coated on a glass substrate to a film thickness of about 2 μm, and the coated glass substrate was kept at 220° C. in a nitrogen (N$_2$) stream for 1.5 hr to bake the coating and then gradually cooled to room temperature in N$_2$.

The baked polyimide film was carefully peeled from the glass substrate and subjected to extraction with hot water at 125° C. for 20 hr, and the extracted water phase was subjected to separation and quantitative determination by ion chromatography to analyze various impurity ions.

Subsequently, small liquid crystal panels having a size of 25×25×0.7 mm were produced using the aligning films subjected to determination of the impurity ions and the content thereof, and a ferroelectric liquid crystal mixture (ZLI-4851-025 manufactured by Merck) was poured into the gap and subjected to examination to determine the state of orientation and polarization switching behavior.

The small liquid crystal panel was produced under conditions of a polyimide film thickness of about 1000 Å, a cell gap of 2.0 μm and anti-parallel rubbing.

The state of orientation was observed under a polarizing microscope at crossed nicols, and the homogeneity of the orientation was evaluated by comparing the quantity of transmitted light at an extinction position where no light is transmitted within a field of view at a magnification of 150 times. In this evaluation, the higher the homogeneity of the orientation within the field of view, the smaller the defect and the smaller the quantity of transmitted light at the extinction position.

The polarization switching behavior was evaluated by comparing a paraelectric current, a polarization switching current and an ionic current defined below that flow in a liquid crystal panel when a triangular wave voltage was applied to the liquid crystal panel.

Figure 2:
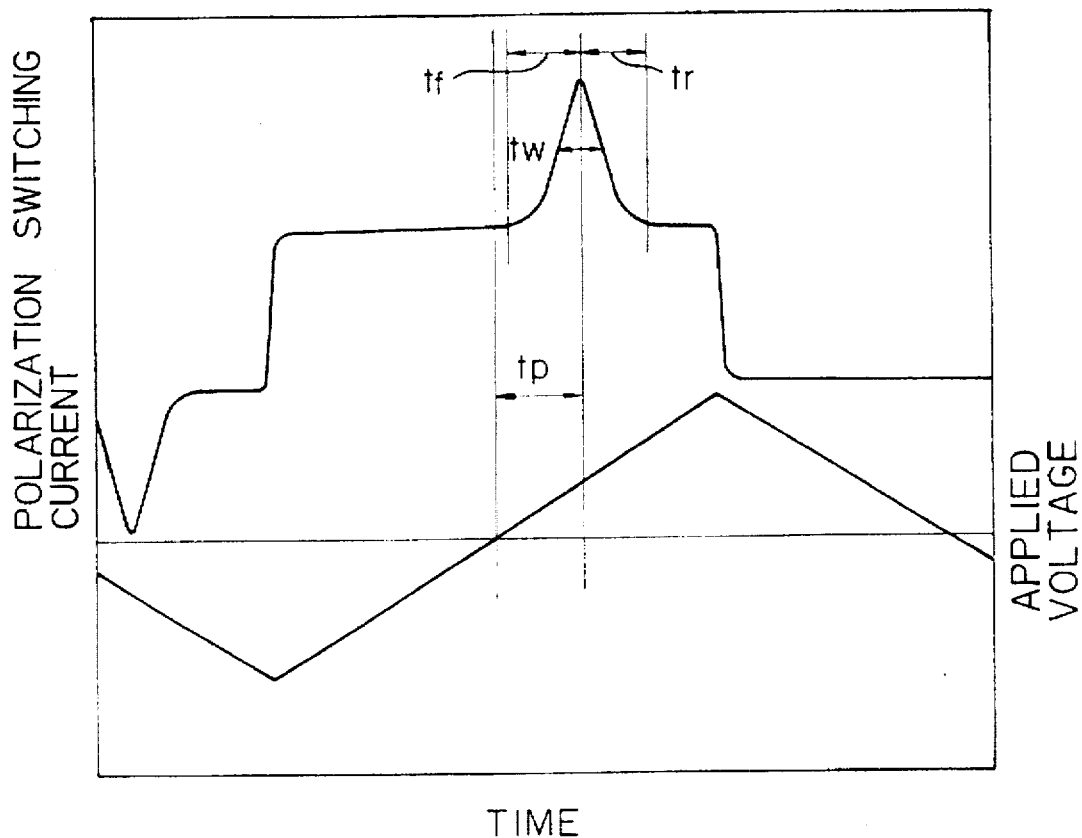
FIG. 2 is a voltage-current waveform diagram for measuring polarization switching characteristics.

FIG. 2 is a voltage-current waveform diagram for measuring polarization switching characteristics. In FIG. 2, $t_p$ represents the time taken for the polarization switching current to reach the peak value after switching of the polarity of the triangular wave voltage, $t_w$ represents the half value width of the polarization switching peak current, $t_f$ represents the time taken in the first half in the polarization switching peak current, and $t_r$ represents the time taken in the latter half of the polarization switching peak current.

In order to examine the relationship between the external force applied to the liquid crystal panel and the stability of the molecular orientation, a liquid crystal panel to be examined was put on a protrusion having a small area, and a weight was put on both ends of the liquid crystal panel to determine the average quantity of transmitted light.

Figure 3:
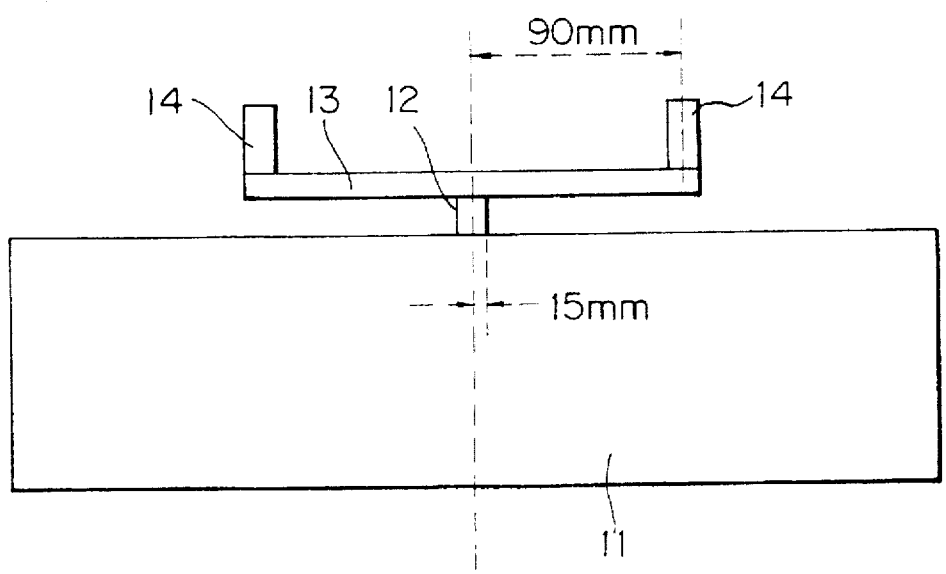
FIG. 3 is an explanatory diagram showing a method of measuring the external force applied to a liquid crystal panel and the stability of molecular orientation.

FIG. 3 is an explanatory diagram showing a method of measuring the external force applied to a liquid crystal panel and the stability of molecular orientation.

In this drawing, numeral 11 designates a table, numeral 12 a protrusion, numeral 13 a liquid crystal panel to be examined, and numeral 14 a weight.

The external force applied to the liquid crystal panel and the stability of the molecular orientation were determined as follows. A liquid crystal panel 13 to be examined was put on a protrusion 12 provided on a table 11. A weight 14 was put on both ends of the liquid crystal panel 13 to be examined, and a load was applied to the liquid crystal panel 13. A change in the orientation of the liquid crystal at the center portion of the liquid crystal panel was determined and evaluated in terms of the change in the transmittance.

In this evaluation, the smaller the change in the transmittance with the load, that is, the larger the load necessary for causing a certain (10%) transmittance change, the higher the orientation stability.

In this case, the width from the center line of the protrusion 12 was 15 mm, and the distance from the center line of the liquid crystal panel 13 to the end portion to which a load is applied was 90 mm.

The results of determination of the species and content of impurity ions are given in Table 1.

TABLE 1

Kind and Content (ppm) of Impurity Ions in Oriented Film of Polyimide

| Ion Species | PI-1 | PI-2 | PI-3 | PI-4 | PI-5 | PI-6 | PI-7 | PI-8 | PI-9 | PI-10 |
|---|---|---|---|---|---|---|---|---|---|---|
| $Li^+$ | — | — | — | — | — | — | — | 0.1 | 0.2 | 0.1 |
| $Na^+$ | 0.8 | 0.4 | 110.0 | 32.0 | 1.3 | 0.3 | 0.9 | 0.2 | 0.4 | 0.5 |
| $NH_4^+$ | 42.0 | 28.0 | 52.0 | 16.0 | 32.0 | 85.0 | 96.0 | 80.0 | 63.0 | 72.0 |
| $K^+$ | — | — | — | — | — | — | — | 0.2 | 0.6 | 0.8 |
| $Mg^{2+}$ | — | — | 3.5 | 0.6 | — | — | — | 0.2 | 0.3 | 0.4 |
| $Ca^{2+}$ | — | — | 1.5 | 1.0 | 0.2 | 0.3 | 0.3 | 0.7 | 1.1 | 1.0 |
| $F^-$ | 0.8 | 1.1 | 0.6 | 0.9 | 1.0 | 0.6 | 1.1 | 1.0 | 0.4 | 0.4 |
| $Cl^-$ | 0.5 | 0.7 | 1.7 | 0.3 | 1.5 | 340.0 | 0.3 | 20.0 | 0.7 | 0.5 |
| $NO_2^-$ | — | — | — | — | — | — | — | — | — | — |
| $PO_4^{3-}$ | — | — | 11.0 | 1.0 | 0.3 | 0.1 | 0.2 | 0.7 | 0.5 | 0.8 |
| $Br^-$ | — | — | 0.2 | 0.1 | 0.1 | 0.7 | 0.2 | 0.3 | 0.2 | 0.1 |
| $NO_3^-$ | 0.8 | 1.2 | 0.6 | 0.8 | 0.2 | 0.5 | 0.6 | 0.5 | 0.1 | 0.2 |
| $SO_4^{2-}$ | 0.6 | 0.9 | 220.0 | 82.0 | 0.1 | 0.2 | 0.3 | 0.3 | 0.4 | 0.8 |
| $(COO)_2^{2-}$ | 11.0 | 6.4 | 15.0 | 4.1 | 5.0 | 5.0 | 8.8 | 4.4 | 3.1 | 3.9 |
| $CH_3COO^-$ | 33.0 | 40.0 | 42.0 | 20.0 | 12.0 | 15.0 | 12.0 | 11.0 | 12.0 | 12.0 |
| $HCOO^-$ | 68.0 | 68.0 | 43.0 | 30.0 | 32.0 | 31.0 | 23.0 | 43.0 | 11.0 | 10.0 |

In Table 1, PI-1 to PI-10 represent 10 polyimide samples. This applies also to Tables 2, 3 and 4.

The time taken for each stage of polarization switching in each liquid crystal panel is summarized in Table 2.

TABLE 2

Time Taken for Each Stage of Polarization Switching in Each Liquid Crystal Panel

| Oriented Film | $P_s$ (nC/cm$^2$) | $t_w$ (µs) | $t_f$ (µs) | $t_r$ (µs) | $t_p$ (µs) |
|---|---|---|---|---|---|
| PI-1 | 25.5 | 86.0 | 110.8 | 67.3 | 200.0 |
| PI-2 | 25.1 | 82.0 | 110.0 | 66.6 | 213.0 |
| PI-3 | 25.6 | 86.2 | 112.3 | 65.4 | 208.0 |
| PI-4 | 27.0 | 70.1 | 100.2 | 80.9 | 194.6 |
| PI-5 | 25.0 | 88.5 | 109.5 | 62.8 | 207.7 |
| PI-6 | 25.1 | 93.4 | 114.7 | 69.0 | 200.2 |
| PI-7 | 24.8 | 70.0 | 110.5 | 89.0 | 188.8 |
| PI-8 | 23.9 | 90.5 | 105.3 | 63.2 | 210.0 |
| PI-9 | 23.3 | 71.2 | 112.4 | 89.9 | 179.9 |
| PI-10 | 24.8 | 72.1 | 99.0 | 88.6 | 181.0 |

FIGS. 4A, 4B, 5A and 5B are diagrams showing the relationship between the impurity ion content and the polarization switching time of a liquid crystal panel.

Figure 4A:
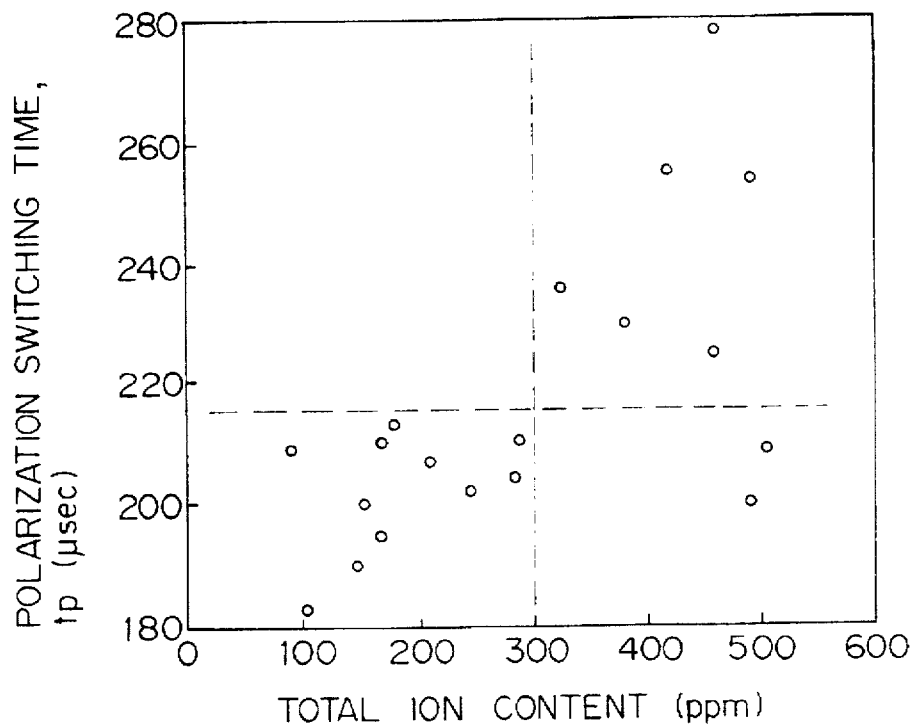
FIGS. 4A, 4B, 5A and 5B are diagrams showing the relationship between the impurity ion content and the polarization switching time of a liquid crystal panel.
Figure 4B:
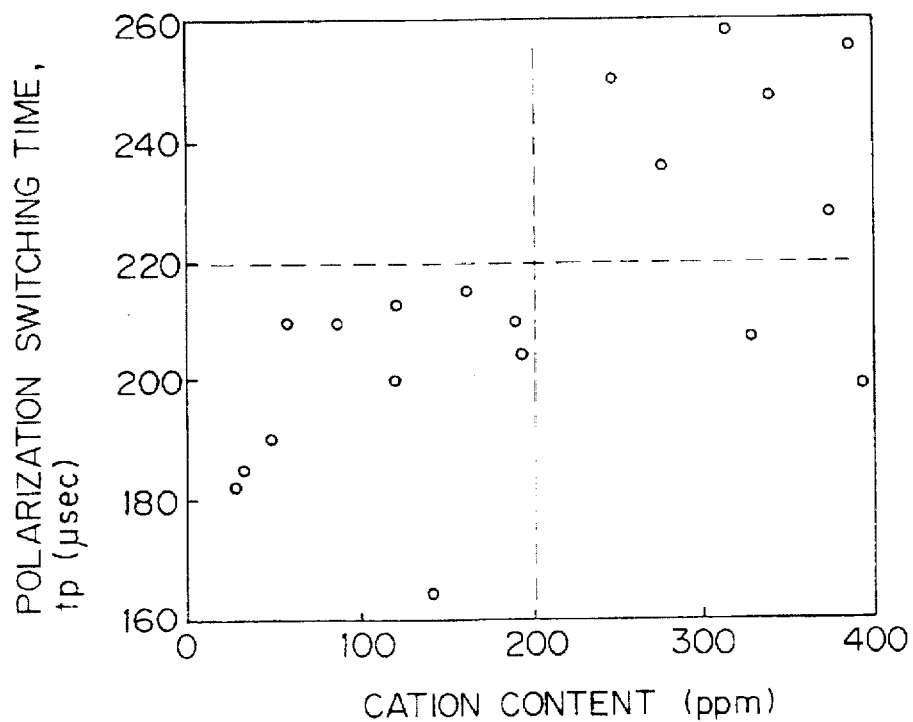
Figure 5A:
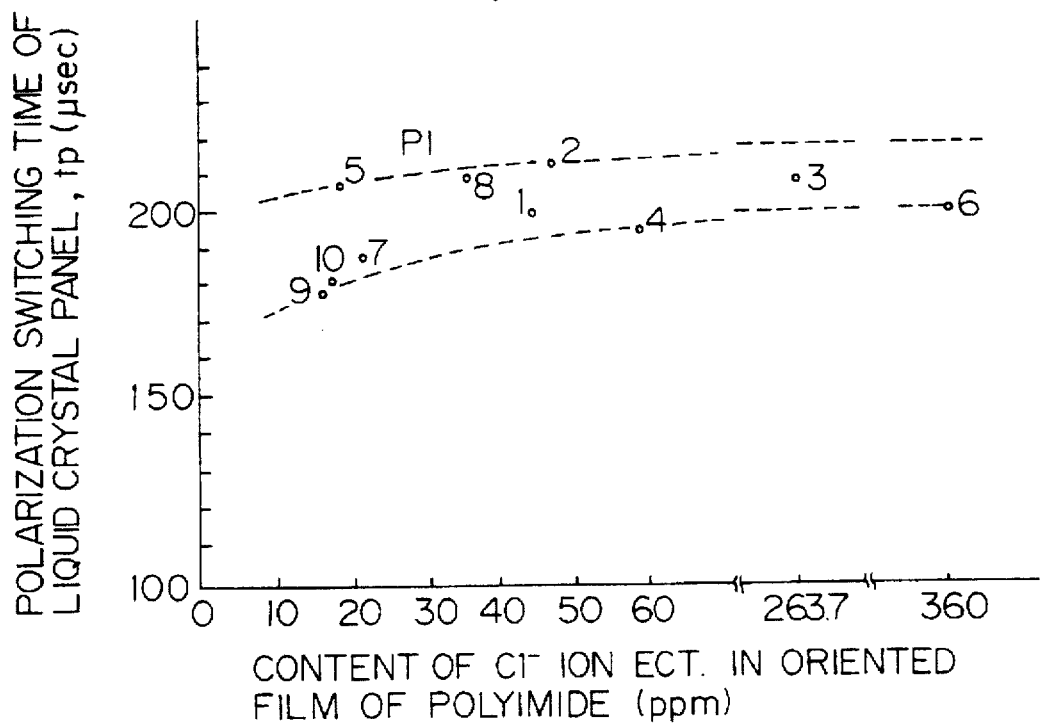
Figure 5B:
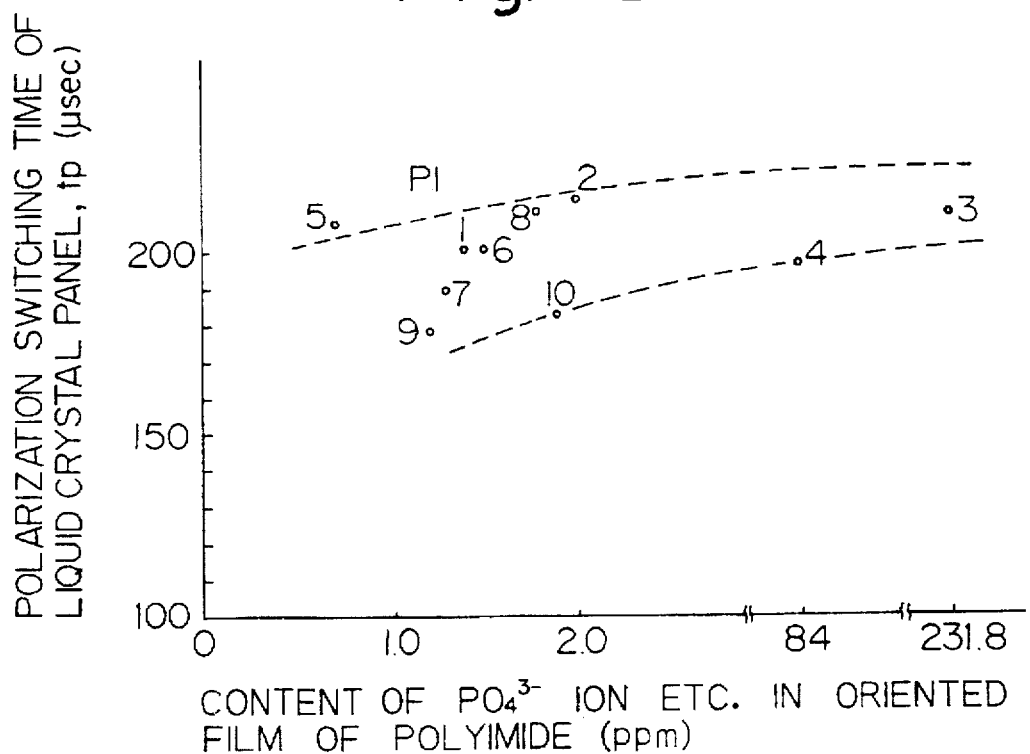

FIG. 4A shows the relationship between the total content of impurity ions in an aligning film of a polyimide and the polarization switching time ($t_p$) of a liquid crystal panel. FIG. 4B shows the relationship between the total content of impurity cations in an aligning film of a polyimide and the polarization switching time of a liquid crystal panel. FIG. 5A shows the content of $Cl^-$, $(COO_2)^-$ and $CH_3COO^-$ ($Cl^-$ ion, etc.) in an aligning film of a polyimide and the polarization switching time of a liquid crystal panel, and FIG. 5B shows the relationship between the content of $PO_4^{3-}$, $NO_3^-$ and $SO_4^{2-}$ ($PO_4^{3-}$ ion, etc.) in an aligning film of a polyimide and the polarization switching time of a liquid crystal panel.

In the drawings, numerals represent respective sample Nos. This is applied also to the drawings which will be described hereinafter.

As can be seen from FIG. 4A, when the total content of impurity ions is high, the polarization switching time ($t_p$) of the liquid crystal panel becomes so long that the polarization switching cannot be smoothly effected. When the total content of impurity ions is higher than 300 ppm, the polarization switching time of the liquid crystal panel becomes 220 µsec or more and, in some cases, is increased to 280 µsec. On the other hand, when the total content of impurity ions is 300 ppm or less, the polarization switching time becomes 220 µsec or less. In this case, there is no possibility of the polarization switching time becoming extremely long.

This is substantially true of FIG. 4B. Specifically, when the total content of impurity cations is high, the polarization switching time ($t_p$) of the liquid crystal panel becomes long. When the total content of impurity cations is higher than 200 ppm, the polarization switching time of the liquid crystal panel becomes 220 µsec or more. On the other hand, when the total content of impurity ions is 200 ppm or less, the polarization switching time becomes relatively short and is 160 to 220 µsec.

From FIG. 5A, it is apparent that when the content of $Cl^-$ ion, etc., is high, the polarization switching time ($t_p$) of the liquid crystal panel becomes long. Specifically, when the content of $Cl^-$ ion, etc., is higher than about 100 ppm, the polarization switching time is increased to about 200 µsec and saturated.

From FIG. 5B, it is apparent that when the content of $PO_4^{3-}$ ion, etc., is high, the polarization switching time ($t_p$) of the liquid crystal panel becomes long. Specifically, when the content of $PO_4^{3-}$ ion, etc., is higher than about 100 ppm, the polarization switching time is increased to about 200 µsec and saturated.

Further, from Tables 1 and 2, it is apparent that the half width ($t_w$) of the polarization switching peak current, which is a substantial response time, is also long for samples having a high content of impurity ions, such as $Cl^-$ ion, etc., (samples PI-3, PI-6 and PI-8).

It is also apparent that, when the content of impurity ions, such as $Cl^-$ ion, etc., and $PO_4^{3-}$ ion, etc., is high, the time taken in the latter half of the polarization switching peak current ($t_r$) becomes short and a somewhat complicated influence is observed.

$t_r$ is a parameter of properties reflecting a problem of anti-electric field during polarization switching inherent in a ferroelectric liquid crystal, and it is considered that $t_r$ becomes short with a reduction in the depolarization field.

Therefore, the presence of cations on a certain level can reduce the depolarization field and enhance the operation stability.

The relationship between the species and content of impurity ions in the aligning film of a polyimide and the quantity of transmitted light at the extinction position of the liquid crystal panel is summarized in Table 3.

the orientation of the liquid crystal structure deteriorates. Specifically, when the total content of impurity ions is higher than 300 ppm, the quantity of transmitted light at the extinction position is increased to above 100 µW. The

TABLE 3

Relationship Between Impurity Ions and Homogeneity of Orientation

| Oriented Film | PI-1 | PI-2 | PI-3 | PI-4 | PI-5 | PI-6 | PI-7 | PI-8 | PI-9 | PI-10 |
|---|---|---|---|---|---|---|---|---|---|---|
| Quantity of transmitted light at extinction position (µw) | 72 | 50 | 78 | 29 | 36 | 120 | 37 | 85 | 18 | 20 |

In Table 3, the quantity of transmitted light shows the relationship between the species and content of impurity ions in the aligning film of a polyimide and the homogeneity of orientation in the liquid crystal panel, and a large quantity of transmitted light at the extinction position indicates that the homogeneity of the liquid crystal panel is poor and the "blackness" in the so-called "dark" state is so poor that the contrast ratio is low.

FIGS. 6A, 6B, 7A and 7B are diagrams showing the relationship between the impurity ion content and the quantity of transmitted light at an extinction position of a liquid crystal panel.

Figure 7A:
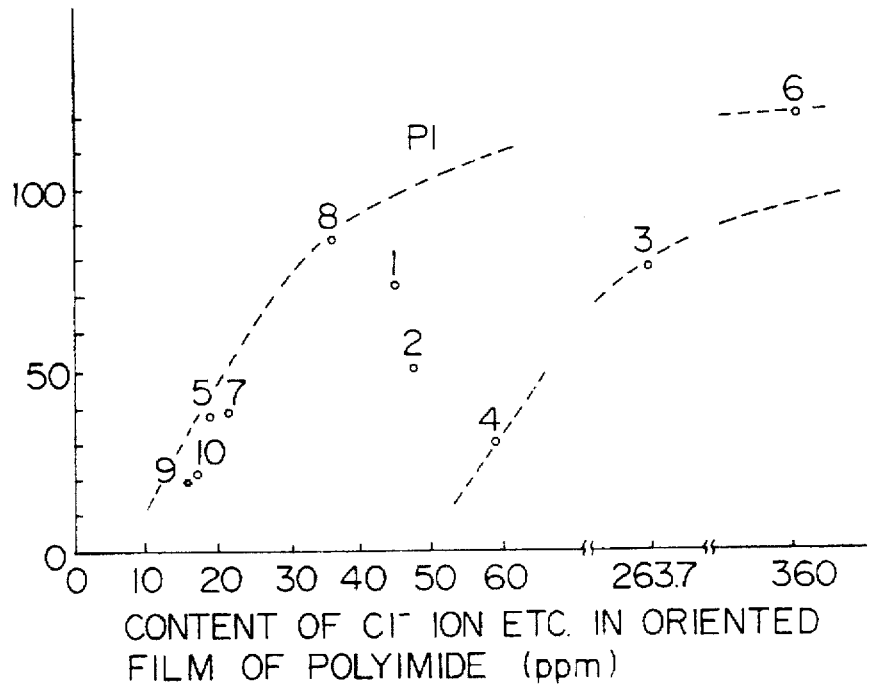
Figure 7B:
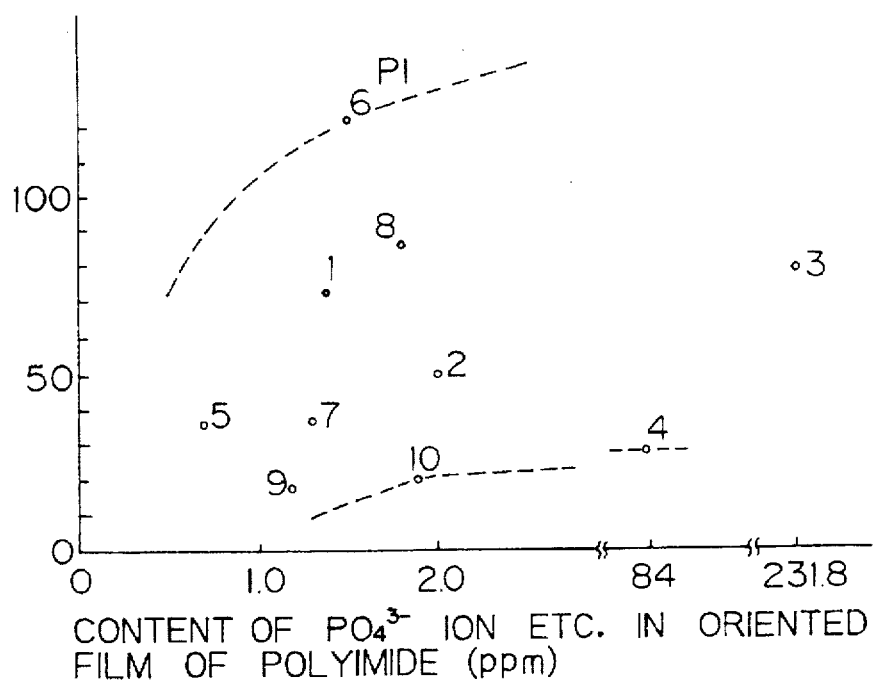

FIG. 6A is a diagram showing the relationship between the total content of impurity ions in the aligning film of a polyimide and the quantity of transmitted light at an extinction position of a liquid crystal panel, FIG. 6B is a diagram showing the relationship between the total content of impurity cations in the aligning film of a polyimide and the quantity of transmitted light at an extinction position of a liquid crystal panel, FIG. 7A is a diagram showing the relationship between the content of Cl⁻ ion, etc., in the aligning film of a polyimide and the quantity of transmitted light at an extinction position of a liquid crystal panel, and FIG. 7B is a diagram showing the relationship between the content of $PO_4^{3-}$ ion, etc., in the aligning film of a polyimide and the quantity of transmitted light at an extinction position of a liquid crystal panel.

As can be seen from FIG. 6A, when the total content of impurity ions is high, the quantity of transmitted light at the extinction position becomes so large that the homogeneity of smaller the quantity of transmitted light at the extinction position, the higher the contrast ratio of the display and the better the image quality. When the quantity of transmitted light at the extinction position exceeds 100 µW, the contrast ratio is lower than 30:1 and the image quality lowers.

This is substantially true of FIG. 6B. Specifically, it is apparent when the total content of impurity cations are high, the quantity of transmitted light at the extinction position becomes large. When the total content of impurity cations exceeds 200 ppm, the quantity of transmitted light at the extinction position is increased to above 100 µW.

From FIG. 7A, it is apparent that when the content of Cl⁻ ion, etc., in the aligning film of a polyimide is high, the quantity of transmitted light at the extinction position of the liquid crystal panel becomes large. When the content of Cl⁻ ion, etc., is higher than about 100 ppm, the quantity of transmitted light at the extinction position is increased to above 100 µW.

Further, as can be seen from FIG. 7B, when the content of $PO_4^{3-}$ ion, etc., in the aligning film of a polyimide is high, the quantity of transmitted light at the extinction position in the liquid crystal structure becomes large and the homogeneity of the orientation of the liquid crystal panel deteriorates. Specifically, when the content of $PO_4^{3-}$ ion, etc., is higher than 100 ppm, the quantity of transmitted light at the extinction position is increased to about 100 µW.

The relationship between the stability of the orientation of the liquid crystal molecules and the ions in the aligning film is summarized in the following Table 4.

TABLE 4

Relationship Between Impurity Ions and Stability of Molecular Orientation of Liquid Crystal

| Oriented Film | PI-1 | PI-2 | PI-3 | PI-4 | PI-5 | PI-6 | PI-7 | PI-8 | PI-9 | PI-10 |
|---|---|---|---|---|---|---|---|---|---|---|
| Load necessary for causing | 190 | 210 | 180 | 320 | 310 | 120 | 350 | 200 | 380 | 380 |

TABLE 4-continued

Relationship Between Impurity Ions and Stability of Molecular Orientation of Liquid Crystal

| Oriented Film | PI-1 | PI-2 | PI-3 | PI-4 | PI-5 | PI-6 | PI-7 | PI-8 | PI-9 | PI-10 |
|---|---|---|---|---|---|---|---|---|---|---|
| 10% change in transmittance (g) | | | | | | | | | | |

FIGS. 8A, 8B, 9A and 9B are diagrams showing the relationship between the impurity ion content and the stability of molecular orientation of a liquid crystal against external force.

Figure 9A:
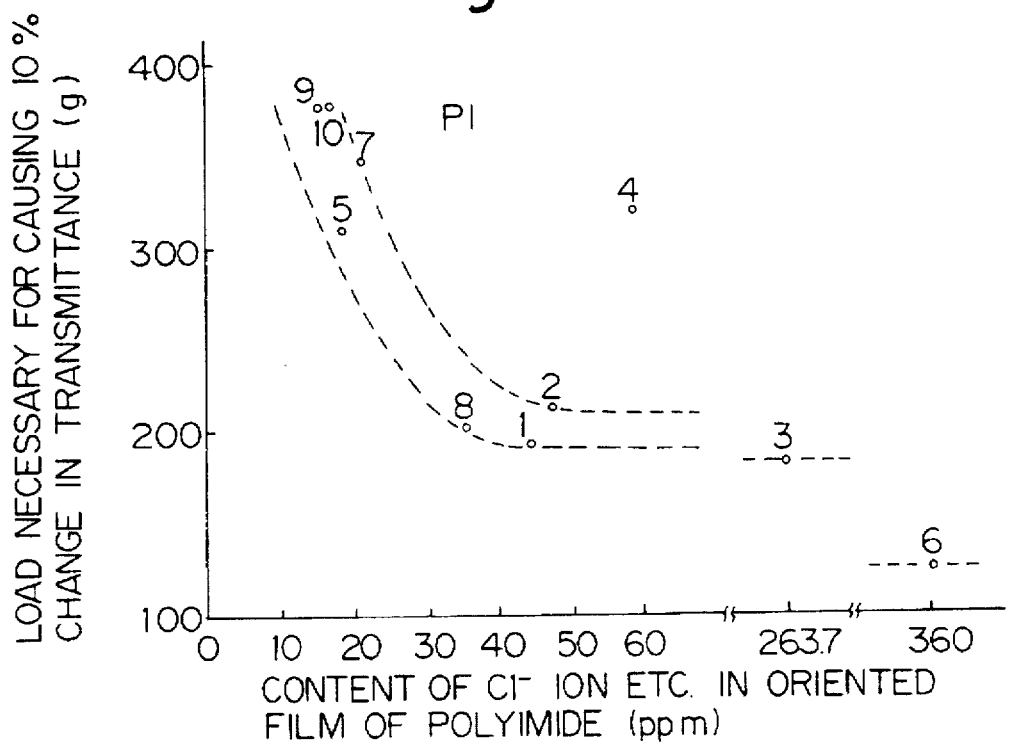
Figure 9B:
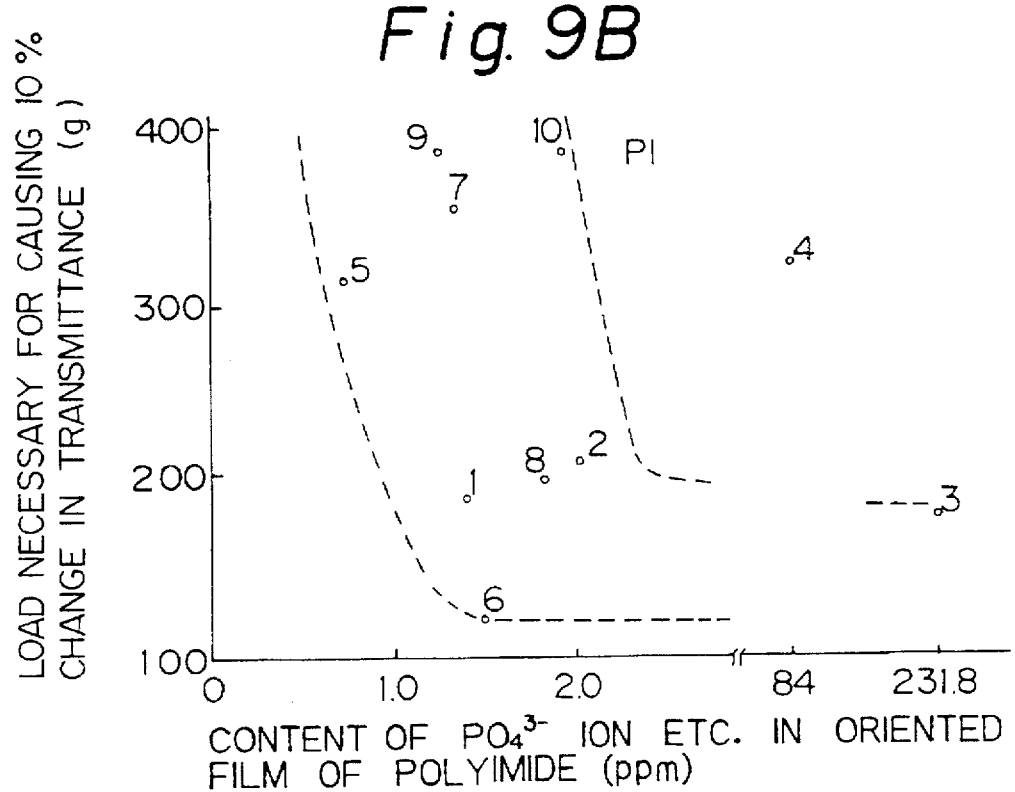

FIGS. 8A is a diagram showing the relationship between the total content of impurity ions in the aligning film of a polyimide and the load necessary for causing a 10% change in transmittance of the liquid crystal panel. FIGS. 8B is a diagram showing the relationship between the total content of impurity cations in the aligning film of a polyimide and the load necessary for causing a 10% change in transmittance of the liquid crystal panel. FIGS. 9A is a diagram showing the relationship between the content of $Cl^-$ ion, etc., in the aligning film of a polyimide and the load necessary for causing a 10% change in transmittance of the liquid crystal panel, and FIG. 9B is a diagram showing the relationship between the content of $PO_4^{3-}$ ion, etc., in the aligning film of a polyimide and the load necessary for causing a 10% change in transmittance of the liquid crystal panel.

In general displays, it is necessary to assume that a load of 150 g or more is applied to the panel.

As can be seen from FIG. 8A, when the total content of impurity ions is large, the load necessary for causing a 10% change in transmittance of the liquid crystal panel becomes so small that the stability against the external force deteriorates. Specifically, when the total content of impurity ions is higher than 300 ppm, the load necessary for causing a 10% change in transmittance of the liquid crystal panel is reduced to about 200 g.

This is substantially true of FIG. 8B. Specifically, when the total content of impurity cations is high, the load necessary for causing a 10% change in transmittance of the liquid crystal panel becomes small. When the total content of impurity cations is higher than 200 ppm, the load necessary for causing a 10% change in transmittance of the liquid crystal panel is reduced to about 200 g.

From FIG. 9A, it is apparent that when the content of $Cl^-$ ion, etc., in the aligning film of a polyimide is high, the load necessary for causing a 10% change in transmittance of the liquid crystal panel becomes small. When the content of $Cl^-$ ion, etc., is higher than 100 ppm, the load necessary for causing 10% change in transmittance of the liquid crystal panel is reduced to about 200 g.

Further, from FIG. 9B, it is apparent that when the content of $PO_4^{3-}$ ion, etc., in the aligning film of a polyimide is high, the load necessary for causing a 10% change in transmittance of the liquid crystal panel is small. Specifically, when the content of $PO_4^{3-}$ ion, etc., is higher than 100 ppm, the load necessary for causing a 10% change in transmittance of the liquid crystal panel is reduced to about 200 g.

An influence of each impurity ion on the properties of the liquid crystal will now be examined.

Figure 10A:
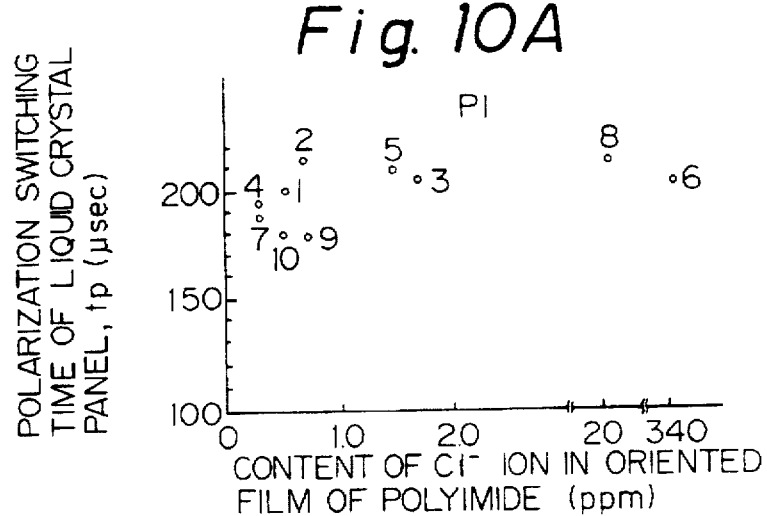
FIGS. 10A to 10C are diagrams showing the relationship between the $Cl^-$ ion content and various properties of a liquid crystal panel.
Figure 10B:
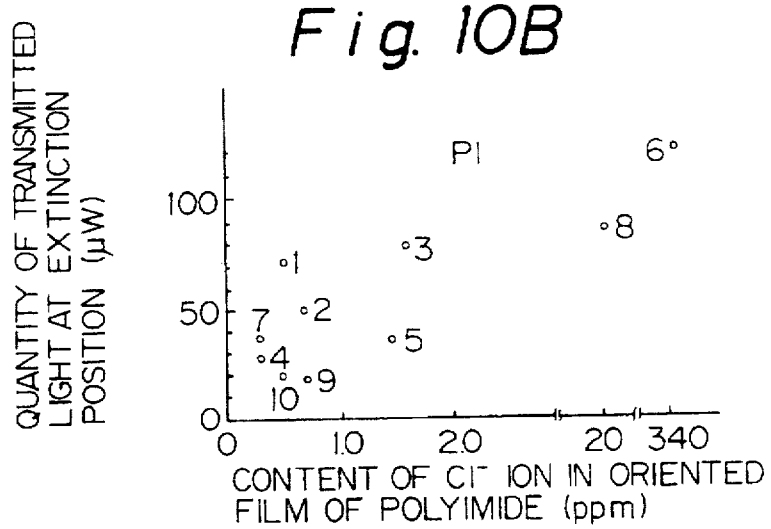
Figure 10C:
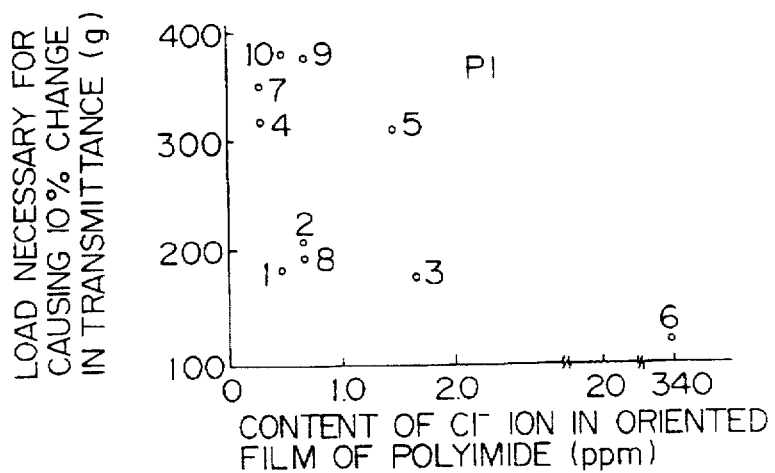

FIGS. 10A to 10C are diagrams showing the relationship between the $Cl^-$ ion content and various properties of a liquid crystal panel.

FIG. 10A is a diagram showing the relationship between the $Cl^-$ ion content in the aligning film of a polyimide and the polarization switching time of the liquid crystal panel, FIG. 10B is a diagram showing the relationship between the $Cl^-$ ion content in the aligning film of a polyimide and the quantity of transmitted light at an extinction position, and FIG. 10C is a diagram showing the relationship between the $Cl^-$ ion content in the aligning film of a polyimide and the load necessary for causing a 10% change in transmittance of the liquid crystal panel.

Figure 11A:
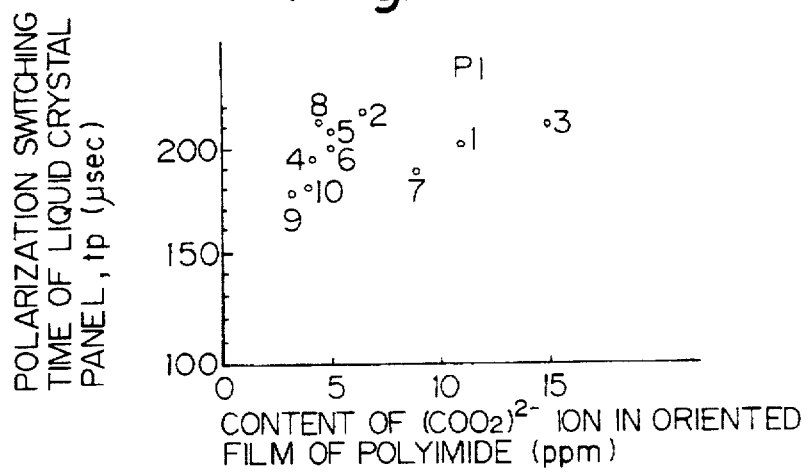
FIGS. 11A to 11C are diagrams showing the relationship between the $(COO_2)^{2-}$ ion content and various properties of a liquid crystal panel.
Figure 11B:
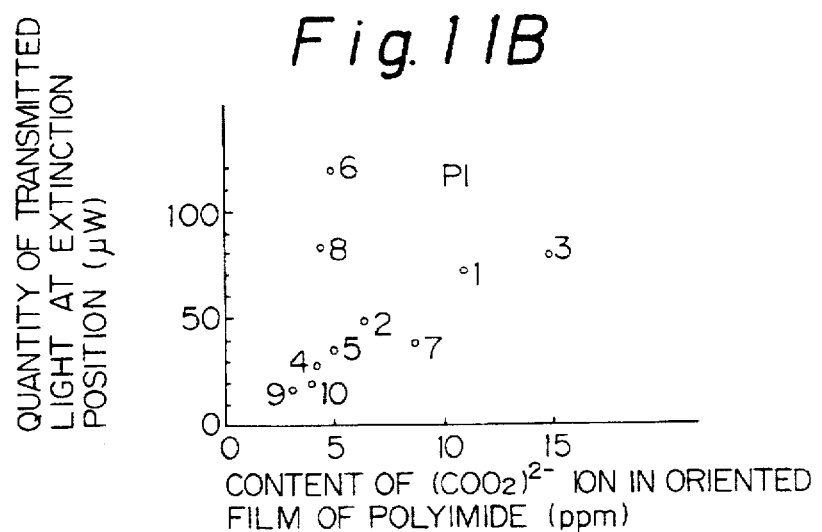
Figure 11C:
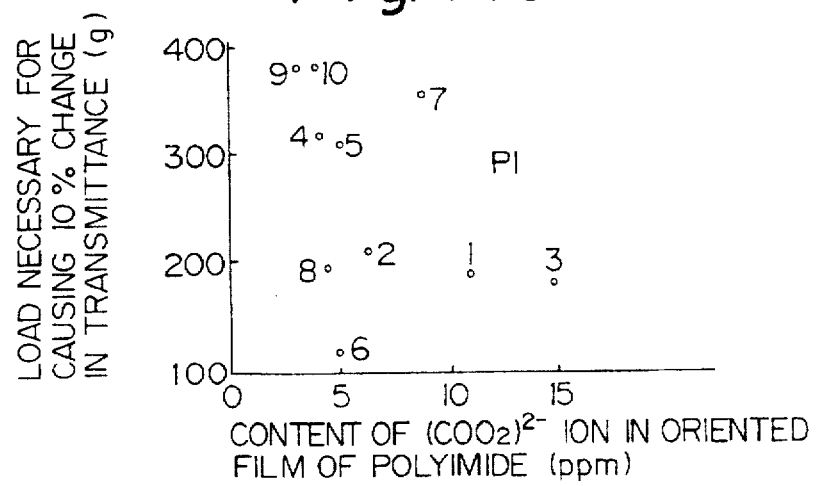

FIGS. 11A to 11C are diagrams showing the relationship between the $(COO_2)^{2-}$ ion content and various properties of a liquid crystal panel.

FIG. 11A is a diagram showing the relationship between the $(COO_2)^{2-}$ ion content in the aligning film of a polyimide and the polarization switching time of the liquid crystal panel, FIG. 11B is a diagram showing the relationship between the $(COO_2)^{2-}$ ion content in the aligning film of a polyimide and the quantity of transmitted light at an extinction position, and FIG. 11C is a diagram showing the relationship between the $(COO_2)^{2-}$ ion content in the aligning film of a polyimide and the load necessary for causing a 10% change in transmittance of the liquid crystal panel.

Figure 12A:
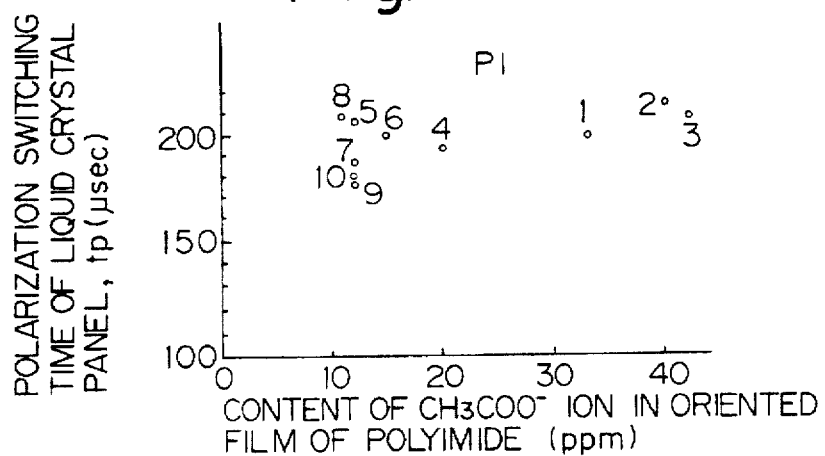
FIGS. 12A to 12C are diagrams showing the relationship between the $CH_3COO^-$ ion content and various properties of a liquid crystal panel.
Figure 12B:
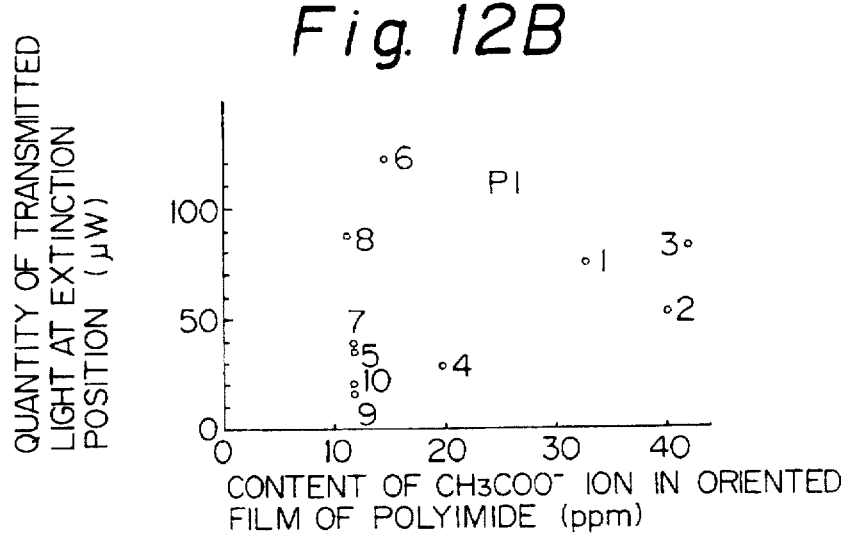
Figure 12C:
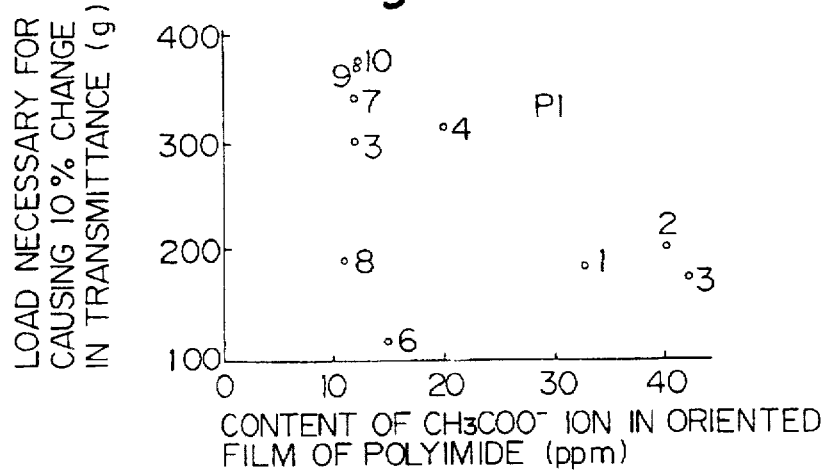

FIGS. 12A to 12C are diagrams showing the relationship between the $CH_3COO^-$ ion content and various properties of a liquid crystal panel.

FIG. 12A is a diagram showing the relationship between the $CH_3COO^-$ ion content in the aligning film of a polyimide and the polarization switching time of the liquid crystal panel, FIG. 12B is a diagram showing the relationship between the $CH_3COO^-$ ion content in the aligning film of a polyimide and the quantity of transmitted light at an extinction position, and FIG. 12C is a diagram showing the relationship between the $CH_3COO^-$ ion content in the aligning film of a polyimide and the load necessary for causing a 10% change in transmittance of the liquid crystal panel.

Figure 13A:
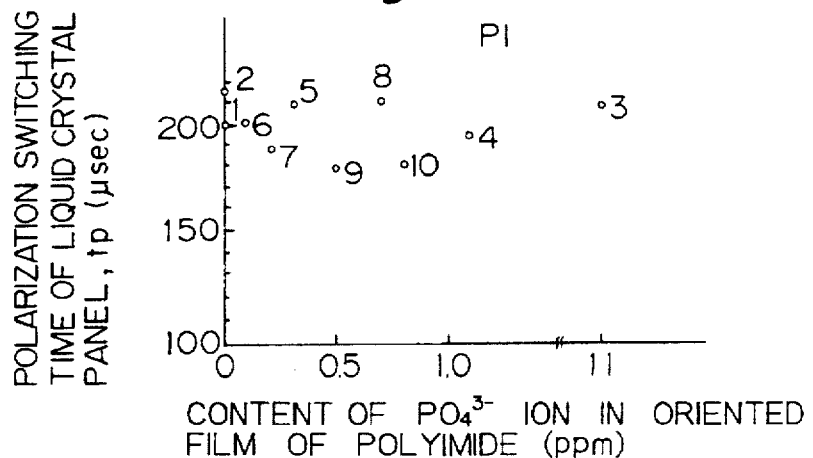
FIGS. 13A to 13C are diagrams showing the relationship between the $PO_4^{3-}$ ion content and various properties of a liquid crystal panel.
Figure 13B:
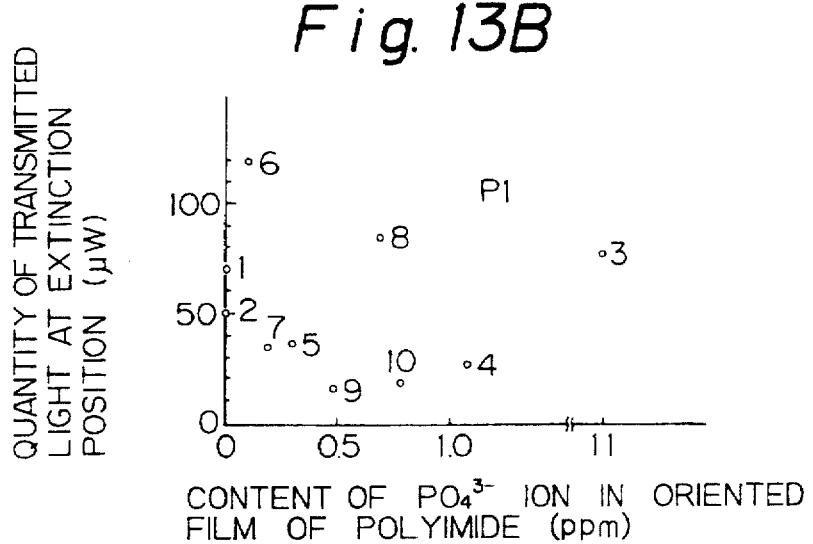
Figure 13C:
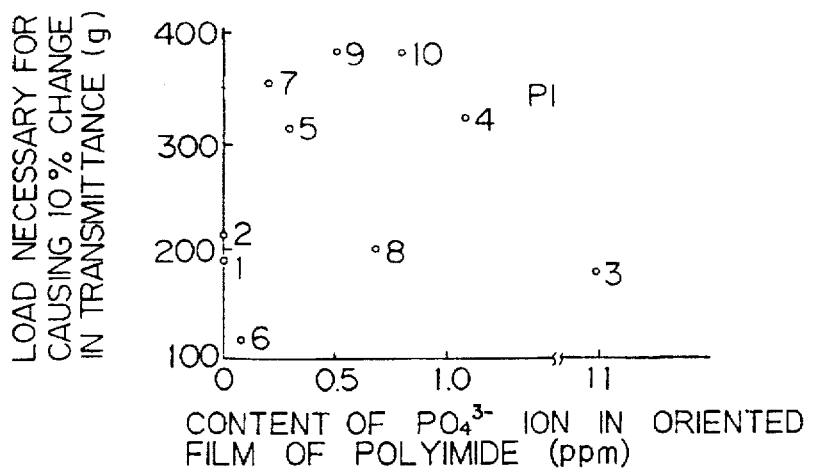

FIGS. 13A to 13C are diagrams showing the relationship between the $PO_4^{3-}$ ion content and various properties of a liquid crystal panel.

FIG. 13A is a diagram showing the relationship between the $PO_4^{3-}$ ion content in the aligning film of a polyimide and the polarization switching time of the liquid crystal panel. FIG. 13B is a diagram showing the relationship between the $PO_4^{3-}$ ion content in the aligning film of a polyimide and the quantity of transmitted light at an extinction position, and FIG. 13C is a diagram showing the relationship between the $PO_4^{3-}$ ion content in the aligning film of a polyimide and the load necessary for causing a 10% change in transmittance of the liquid crystal panel.

Figure 14A:
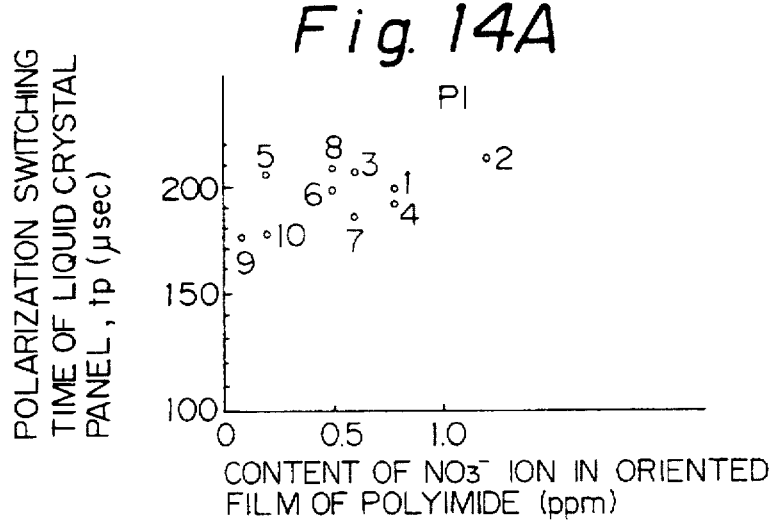
FIGS. 14A to 14C are diagrams showing the relationship between the $NO_3^-$ ion content and various properties of a liquid crystal panel.
Figure 14B:
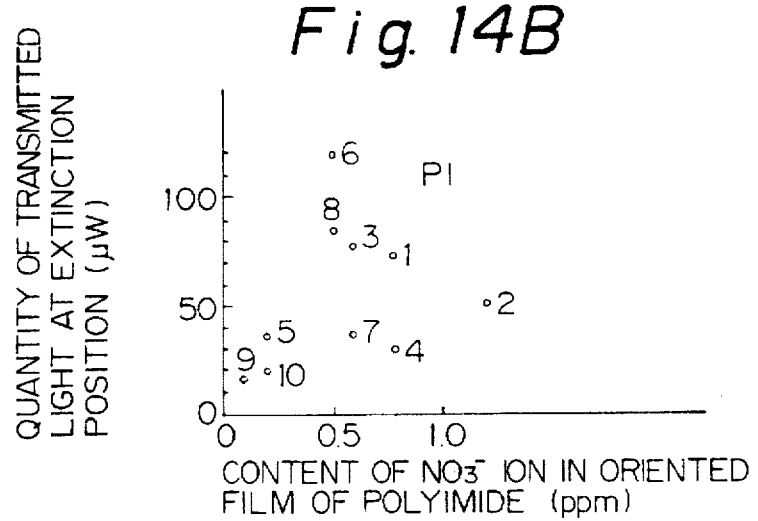
Figure 14C:
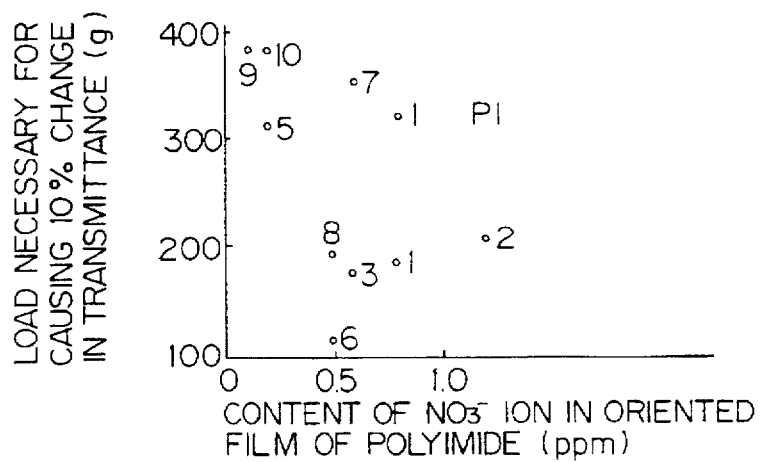

FIGS. 14A to 14C are diagrams showing the relationship between the $NO_3^-$ ion content and various properties of a liquid crystal panel.

FIG. 14A is a diagram showing the relationship between the $NO_3^-$ ion content in the aligning film of a polyimide and the polarization switching time of the liquid crystal panel, FIG. 14B is a diagram showing the relationship between the $NO_3^-$ ion content in the aligning film of a polyimide and the quantity of transmitted light at an extinction position, and FIG. 14C is a diagram showing the relationship between the $NO_3^-$ ion content in the aligning film of a polyimide and the load necessary for causing a 10% change in transmittance of the liquid crystal panel.

Figure 15A:
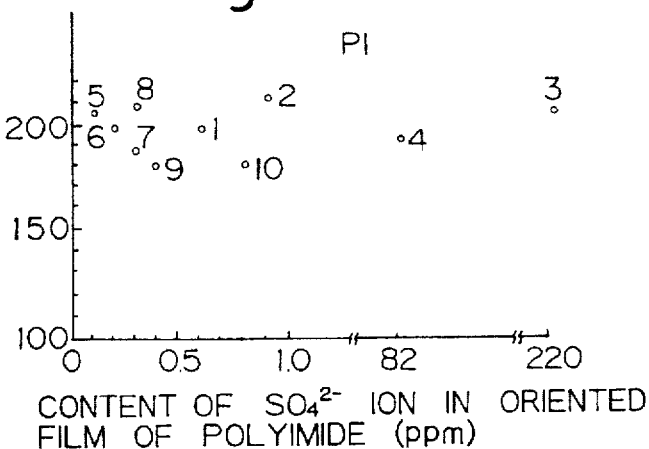
FIGS. 15A to 15C are diagrams showing the relationship between the $SO_4^{2-}$ ion content and various properties of a liquid crystal panel.
Figure 15B:
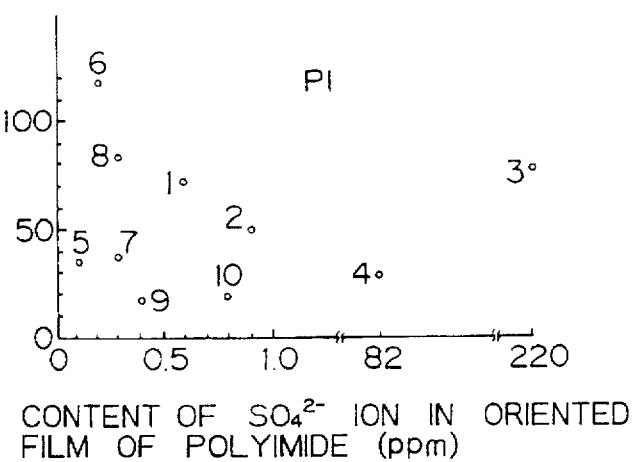
Figure 15C:
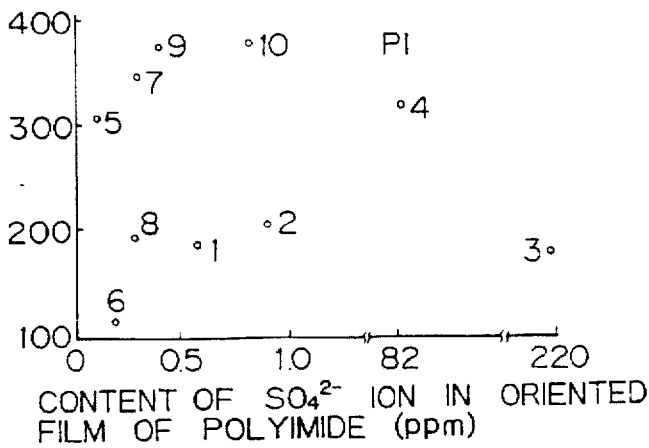
Figure 5A:
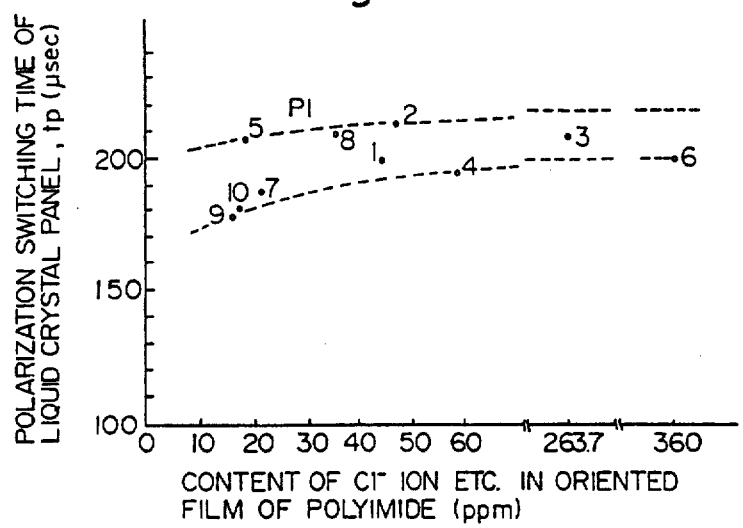
Figure 5B:
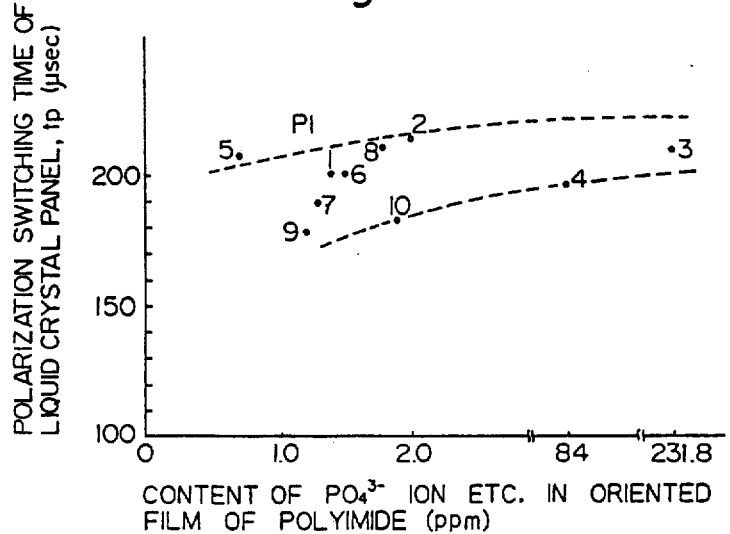

FIGS. 15A to 15C are diagrams showing the relationship between the $SO_4^{2-}$ ion content and various properties of a liquid crystal panel.

FIG. 15A is a diagram showing the relationship between the $SO_4^{2-}$ ion content in the aligning film of a polyimide and the polarization switching time of the liquid crystal panel, FIG. 15B is a diagram showing the relationship between the $SO_4^{2-}$ ion content in the aligning film of a polyimide and the quantity of transmitted light at an extinction position, and FIG. 15C is a diagram showing the relationship between the $SO_4^{2-}$ ion content in the aligning film of a polyimide and the load necessary for causing 10% change in transmittance of the liquid crystal panel.

From FIGS. 10A to 10C, FIGS. 11A to 11C, FIGS. 12A to 12C, FIGS. 13A to 13C, FIGS. 14A to 14C and FIGS. 15A to 15C, when the $Cl^-$ ion, $(COO_2)^{2-}$ ion, $CH_3COO^-$ ion, $PO_4^{3-}$ ion, $NO_3^-$ ion and $SO_4^{2-}$ ion are contained alone in an amount of about 50 ppm in the aligning film polyimide, various property values of the liquid crystal panel fall within the above-described numerical ranges.

As is apparent from the above-described studies, it is apparent that, with respect to the $Cl^-$ ion, $(COO_2)^{2-}$ ion, $CH_3COO^-$ ion, etc., the lower the content, the better the homogeneity of the molecular orientation and the higher the stability of the molecular orientation and the better the smoothness of the polarization switching.

Further, as described above, with respect to the polarization switching, the presence of ions on a certain level renders the polarization switching more smooth. In this case, this effect can be attained also when the ions are cations, such as $PO_4^{3-}$ ion, which are less liable to deteriorate the orientation stability.

PI-8 and PI-6 are samples subjected to a deionization treatment with an ion-exchange resin. It is apparent that the deionization treatment enables the content of ions detrimental to the molecular orientation of the liquid crystal to be lowered, which contributes to an improvement in the electrooptic characteristics of the liquid crystal cell.

This shows that the deionization treatment of the aligning film with an ion-exchange resin is useful as the step of regulating the content of ions in the aligning film.

In the above-described Examples, the aligning film comprises a polyimide. Besides the polyimide, polyamideimide (PAI), polyvinyl alcohol (PVA), etc., may also be used as the resin for constituting the aligning film. The effect of the present invention is not derived from the fundamental structure of the resin, and impurity ions contained in the resin plays an important role in the effect of the present invention. Therefore, even when use is made of resins other than the polyimide, the effect attained is substantially the same as that described above in connection with the use of the polyimide.

Resins, such as polyimide, used as the aligning film in the conventional liquid crystal displays contain impurities in an amount on the % order. The present inventors have aimed at the relationship between the capability of the aligning film to regulate the molecular orientation and the impurities contained in the aligning film, which relationships has been neglected in the art, and have established conditions for improving various properties of the liquid crystal display.

As described above, the present invention can attain large area/homogeneous orientation, stability of the molecular orientation against mechanical external force and increase in the polarization switching speed in ferroelectric liquid crystals which have been the tasks to be accomplished in the prior art. This renders the present invention very useful for putting ferroelectric liquid crystal displays to practical use.

We claim:

1. A ferroelectric liquid crystal display device comprising:
   a pair of transparent substrates having respective major surfaces in opposed, spaced relationship;
   a pair of transparent electrodes respectively provided on the opposed, major surfaces of the pair of transparent substrates;
   aligning films, of a common resin, respectively formed on the exposed major surfaces of the transparent electrodes and having respective, exposed major surfaces remote from the respective transparent substrates; and
   a ferroelectric liquid crystal layer sandwiched between and contacting the exposed major surfaces of the aligning films,
   wherein said common resin has a total content of $Cl^-$, $(COO_2)^{2-}$ and $CH_3COO$ of 100 ppm or less and the content of each of said ions is 50 ppm or less, and said common resin has a total content of impurity cations of 200 ppm or less, and
   wherein said total content of $Cl^-$, $(COO_2)^{2-}$, and $CH_3COO$ and said total content of impurity cations in said common resin is sufficiently low to prevent substantial Coulomb interaction at the interface of said liquid crystal layer and said aligning films, whereby the liquid crystal molecules of said liquid crystal layer are free to move relative to said aligning films, thereby reducing distortion of said liquid crystal layer when the panel is deformed.

2. The device according to claim 1, wherein the common resin is a polyimide resin.

3. A ferroelectric liquid crystal display device comprising:
   a pair of transparent substrates having respective major surfaces in spaced, opposed relationship;
   a pair of transparent electrodes respectively provided on the opposed, major surfaces of the pair of transparent substrates;
   aligning films, of a common resin, respectively formed on the exposed major surfaces of the transparent electrodes and having respective, exposed major surfaces remote from the respective transparent substrates; and
   a ferroelectric liquid crystal layer sandwiched between and contacting the exposed major surfaces of the aligning films,
   wherein said common resin has a total content of $PO_4^{3-}$, $NO_3^-$ and $SO_4^-$ of 100 ppm or less and the content of each of said ions being 50 ppm or less and said common resin has a total content of impurity cations of 200 ppm or less, wherein said total content of $PO_4^{3-}$, $NO_3^-$ and $SO_4^-$ is sufficiently low to shorten polarization switching time of said liquid crystal layer, and wherein said total content of said impurity cations in said common resin is sufficiently low to prevent substantial Coulomb interaction at the interface of said liquid crystal layer and said aligning films, whereby the liquid crystal molecules of said liquid crystal layer are free to move relative to said aligning films, thereby reducing distortion of said liquid crystal layer when the panel is deformed.

4. The device according to claim 3, wherein the common resin is a polyimide resin.

* * * * *

UNITED STATES PATENT AND TRADEMARK OFFICE
CERTIFICATE OF CORRECTION

PATENT NO. : 5,739,885
DATED : Apr. 14, 1998
INVENTOR(S) : MOCHIZUKI et al.

Page 1 of 2

It is certified that error appears in the above-identified patent and that said Letters Patent is hereby corrected as shown below:

TITLE PAGE:
[73] Assignee: Change "Kanagawa" to --Kawasaki--.

Sheet 4 of 14:
Replace with the attached sheet of drawings which contains the corrected version of Fig. 5A.

Col. 3, line 9, change "presents" to --present--.

Col. 12, line 50, change "about" to --above--.

Signed and Sealed this

Fifteenth Day of May, 2001

Attest:

NICHOLAS P. GODICI

Attesting Officer

Acting Director of the United States Patent and Trademark Office